(12) United States Patent
Saito

(10) Patent No.: US 11,842,146 B2
(45) Date of Patent: Dec. 12, 2023

(54) INFORMATION PROCESSING APPARATUS, SYSTEM, AND INFORMATION PROCESSING METHOD

(71) Applicant: Satoshi Saito, Saitama (JP)

(72) Inventor: Satoshi Saito, Saitama (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/120,458

(22) Filed: Mar. 13, 2023

(65) Prior Publication Data

US 2023/0306195 A1    Sep. 28, 2023

(30) Foreign Application Priority Data

Mar. 23, 2022  (JP) .................................. 2022-047543
Nov. 30, 2022  (JP) .................................. 2022-192067

(51) Int. Cl.
*G06F 40/186*    (2020.01)

(52) U.S. Cl.
CPC ................................ *G06F 40/186* (2020.01)

(58) Field of Classification Search
CPC ...................................................... G06F 40/186
See application file for complete search history.

(56) References Cited

U.S. PATENT DOCUMENTS

2002/0103858 A1*  8/2002  Bracewell ............... H04L 67/75
                                                        715/239
2004/0139188 A1    7/2004  Imai
2013/0201508 A1*  8/2013  Zhang ................. H04N 1/00408
                                                        358/1.13
2016/0170955 A1*  6/2016  Choi ...................... G06F 16/958
                                                        715/243
2018/0217966 A1*  8/2018  Buttolo .................... H04L 67/12
2018/0357215 A1* 12/2018  Austin ................. G06F 16/9535
(Continued)

FOREIGN PATENT DOCUMENTS

JP    2004-310728    11/2004
JP    2007-334612    12/2007
(Continued)

*Primary Examiner* — Hassan Mrabi
(74) *Attorney, Agent, or Firm* — XSENSUS LLP

(57) ABSTRACT

An information processing apparatus, a system, and an information processing method. The information processing apparatus generates template information including a setting value to be set in the device, generates, based on the input through an association screen displayed on the administrator terminal, association information for associating the template information and device identification information for identifying a device among the plurality of devices, for which the setting value included in the template information is to be set, receives communication information transmitted from the plurality of devices including device identification information for identifying the device, and in response to receiving the communication information including the device identification information associated by the association information, transmits, to a transmission source device of the communication information, a setting request for setting the setting value included in the template information associated with the device identification information in the association information.

17 Claims, 29 Drawing Sheets

(56) References Cited

U.S. PATENT DOCUMENTS

| | | |
|---|---|---|
| 2019/0082058 A1 | 3/2019 | Aoki |
| 2021/0026581 A1 | 1/2021 | Saito |
| 2022/0121811 A1* | 4/2022 | Norota .................. G06Q 10/10 |

FOREIGN PATENT DOCUMENTS

| | | |
|---|---|---|
| JP | 2014-041521 | 3/2014 |
| JP | 2019-049913 | 3/2019 |

* cited by examiner

FIG. 3

| | |
|---|---|
| ENERGY SAVING PRIORITY MODE (DEFAULT) | THE DEVICE DOES NOT PERIODICALLY COMMUNICATE WITH THE CLOUD DEVICE MANAGEMENT SERVICE WHILE THE DEVICE IS IN THE ENERGY SAVING MODE. A SETTING REQUEST FOR DEVICE SETTINGS INPUT FROM THE ADMINISTRATOR TERMINAL TO THE CLOUD DEVICE MANAGEMENT SYSTEM IS ACQUIRED AND REFLECTED AFTER THE DEVICE RECOVERS FROM THE ENERGY SAVING MODE AND STARTS PERIODICAL COMMUNICATION. |
| IMMEDIATE REFLECTION PRIORITY MODE FOR DEVICE SETTING CHANGE | THE DEVICE PERIODICALLY COMMUNICATE WITH THE CLOUD DEVICE MANAGEMENT SERVICE EVEN WHILE THE DEVICE IS IN THE ENERGY SAVING MODE. A SETTING REQUEST FOR DEVICE SETTINGS INPUT FROM THE ADMINISTRATOR TERMINAL TO THE CLOUD DEVICE MANAGEMENT SYSTEM IS IMMEDIATELY ACQUIRED AND REFLECTED BY THE DEVICE. |

FIG. 7

| Template Name | Description | Last Updated By | Last Updated On | | |
|---|---|---|---|---|---|
| template1 | | user1 | 04/16/2021 10:12 | ✏️ | 🗑️ |
| template2 | | user2 | 04/19/2021 16:37 | ✏️ | 🗑️ |
| template3 | | user2 | 04/20/2021 11:48 | ✏️ | 🗑️ |

Device Settings — Tab
Template / Device Settings
Create Template — B5

Device Settings
Request to Device

```
{
device_settings[
    {
      "settings_name": "admin_email_address",
      "settings_value": "admin@example.com"
    },
    {
      "settings_name": "email_reception_protocol",
      "settings_value": "POP3"
    },
    {
      "settings_name": "email_reception_interval",
      "settings_value": true
    },
            ⋮
    {
      "settings_name": "device_action_mode",
      "settings_value": "device_settings_changed_instantly"
    },
            ⋮
]
}
```

FIG. 11

| CUSTOMER ID | TEMPLATE ID | TEMPLATE NAME | DE-SCRIP-TION | STORED AT | LAST UPDATED BY | LAST UPDATED ON |
|---|---|---|---|---|---|---|
| 1 | 100 | TEMPLATE1 | | /TEMPLATES/1/1 | USER1 | 04/16/2021 10:12 |
| 1 | 101 | TEMPLATE2 | | /TEMPLATES/1/2 | USER2 | 04/19/2021 16:37 |
| 1 | 102 | TEMPLATE3 | | /TEMPLATES/1/3 | USER2 | 04/20/2021 11:48 |

FIG. 12

| Device Settings | | | | | | |
|---|---|---|---|---|---|---|
| Template | Device Settings | | | | | |
| Associate Template and Device | | | | | | |
| Template Name | Description | | | | Last Updated By | Last Updated On |
| template1 | | Start Setting | Check Settings Match | ✏️ | 🗑️ | user1 | 04/21/2021 13:18 |
| template2 | | Start Setting | Check Settings Match | ✏️ | 🗑️ | user2 | 05/27/2021 09:56 |
| template3 | | Start Setting | Check Settings Match | ✏️ | 🗑️ | user2 | 05/31/2021 14:28 |

Device Settings
Request to Device

| Device Settings | | | | | | |
|---|---|---|---|---|---|---|
| Template | Device Settings | | | | | |
| Associate Template and Device | | | | | | |
| Template Name | Description | | | | Last Updated By | Last Updated On |
| template1 | | Start Setting | Check Settings Match | | user1 | 04/21/2021 13:18 |
| template2 | | Start Setting | Check Settings Match | | user2 | 05/27/2021 09:56 |
| template3 | | Start Setting | Check Settings Match | | user2 | 05/31/2021 14:28 |

Template 1 will be applied in hh:mm.

Device Settings
Request to Device

| TEMPLATE AND DEVICE ASSOCIATION ID | TEMPLATE ID | DEVICE ID | LAST UPDATED BY | LAST UPDATED ON |
|---|---|---|---|---|
| 1 | 100 | 1000 | USER1 | 04/21/2021 13:18 |
| 2 | 100 | 1001 | USER1 | 04/21/2021 13:18 |
| 3 | 100 | 1002 | USER1 | 04/21/2021 13:18 |
| 4 | 100 | 1003 | USER1 | 04/21/2021 13:18 |
| 5 | 100 | 1004 | USER1 | 04/21/2021 13:18 |

FIG. 18

| TEMPLATE AND DEVICE ASSOCIATION ID | DESCRIPTION | LAST UPDATED BY | LAST UPDATED ON |
|---|---|---|---|
| 1 | | USER1 | 04/21/2021 13:18 |
| 2 | | USER2 | 05/27/2021 09:56 |
| 3 | | USER3 | 05/31/2021 14:28 |

FIG. 19

| REQUEST ID TO DEVICE | DEVICE ID | REQUEST TYPE | TEMPLATE ID | STATUS | REQUESTED BY | START DATE AND TIME | COMPLETION DATE AND TIME |
|---|---|---|---|---|---|---|---|
| 1 | 1000 | SETTING CHANGE | 100 | COMPLETED | USER1 | 04/21/2021 14:10 | 04/21/2021 14:13 |
| 2 | 1001 | SETTING CHANGE | 100 | ACCEPTED | USER1 | 04/21/2021 14:10 | |
| 3 | 1002 | SETTING CHANGE | 100 | EXECUTING | USER1 | 04/21/2021 14:10 | |
| 4 | 1003 | SETTING CHANGE | 100 | EXECUTING | USER1 | 04/21/2021 14:10 | |
| 5 | 1004 | SETTING CHANGE | 100 | EXECUTING | USER1 | 04/21/2021 14:10 | |

FIG. 20

List of Requests to Device — D9

There are following four statuses.
Accepted
Executing
Completed
Error

Enter Template Name

| Device Name | Model Name | Serial Number | Task | Information Type | Description | Description | Requested By | Start Date and Time | Completion Date and Time |
|---|---|---|---|---|---|---|---|---|---|
| MP C307 JPN(10.60.152.151) | MP C307 JPN | 3F86-100091 | Settings Change | Device Settings | Completed | TEMPLATE1 | USER1 | 04/21/2021 14:10 | 04/21/2021 14:13 |
| MP C307 JPN(10.60.152.152) | MP C307 JPN | 3F86-100092 | Settings Change | Device Settings | Accepted | TEMPLATE1 | USER1 | 04/21/2021 14:10 | |
| MP C307 JPN(10.60.152.153) | MP C307 JPN | 3F86-100093 | Settings Change | Device Settings | Executing | TEMPLATE1 | USER1 | 04/21/2021 14:10 | |
| MP C307 JPN(10.60.152.154) | MP C307 JPN | 3F86-100094 | Settings Change | Device Settings | Executing | TEMPLATE1 | USER1 | 04/21/2021 14:10 | |
| MP C307 JPN(10.60.152.155) | MP C307 JPN | 3F86-100095 | Settings Change | Device Settings | Executing | TEMPLATE1 | USER1 | 04/21/2021 14:10 | |

Device Settings
Request to Device

FIG. 22

| Device Settings | | | | | | |
|---|---|---|---|---|---|---|
| Template | Device Settings | | | | | |
| Associate Template and Device | | | | | | |
| Template Name | Description | | | | Last Updated By | Last Updated On |
| template1 | | Start Setting | Check Settings Match | ✏️ | 🗑️ | user1 | 04/21/2021 13:18 |
| template2 | | Start Setting | Check Settings Match | ✏️ | 🗑️ | user2 | 05/27/2021 09:56 |
| template3 | | Start Setting | Check Settings Match | ✏️ | 🗑️ | user2 | 05/31/2021 14:28 |

B9 — Check Settings Match column
D10 — Last Updated columns

Device Settings
Request to Device

FIG. 25

```
{
device_settings[
   {
      "settings_name": "admin_email_address",
      "settings_value": "admin@example.com"
   },
   {
      "settings_name": "email_reception_protocol",
      "settings_value": "POP3"
   },
   {
      "settings_name": "email_reception_interval",
      "settings_value": true
   },
            ⋮
]
}
```

FIG. 28

| Device Name | Model Name | Serial Number | |
|---|---|---|---|
| MP C307 JPN(10.60.152.151) | MP C307 JPN | 3F86-100091 | Details |
| MP C307 JPN(10.60.152.152) | MP C307 JPN | 3F86-100092 | Details |
| | | | |
| | | | |
| | | | |

Settings of following devices do not match with template.

Setting Start    Back

INFORMATION PROCESSING APPARATUS, SYSTEM, AND INFORMATION PROCESSING METHOD

CROSS-REFERENCE TO RELATED APPLICATIONS

This patent application is based on and claims priority pursuant to 35 U.S.C. § 119(a) to Japanese Patent Application No. 2022-047543, filed on Mar. 23, 2022, and Japanese Patent Application No. 2022-192067, filed on Nov. 30, 2022, in the Japan Patent Office, the entire disclosure of which is hereby incorporated by reference herein.

BACKGROUND

Technical Field

The present disclosure relates to an information processing apparatus, a system, and an information processing method.

BACKGROUND ART

A technique for collectively changing settings of devices through a firewall is disclosed. However, according to the disclosed technique, convenience is not taken into consideration when a user such as an administrator makes desired settings for a desired device.

SUMMARY

Embodiments of the present disclosure describe an information processing apparatus, a system, and an information processing method. The information processing apparatus generates, based on an input through a template information generation screen displayed on the display of the administrator terminal, template information including a setting value to be set in the device, generates, based on the input through an association screen displayed on the display of the administrator terminal, association information for associating the template information and device identification information for identifying a device among the plurality of devices, for which the setting value included in the template information is to be set, receives through the network, communication information transmitted from the plurality of devices, the communication information including device identification information for identifying the device and in response to receiving the communication information including the device identification information associated by the association information, transmits, to a transmission source device of the communication information through the network, a setting request for setting the setting value included in the template information associated with the device identification information in the association information.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 3 is a diagram illustrating modes of an imaging device according to the embodiments of the present disclosure;

FIG. 7 is a diagram illustrating an example of a screen for requesting registration of a device setting template according to the embodiments of the present disclosure;

FIG. 10 is a diagram illustrating a device setting template file according to the embodiments of the present disclosure;

FIG. 11 is a diagram illustrating an example of management of the device setting template according to the embodiments of the present disclosure;

FIG. 12 is a diagram illustrating an example of a screen for requesting association between a device result template and a device according to the embodiments of the present disclosure;

FIG. 13 is a diagram illustrating an example of a screen for selecting a template according to the embodiments of the present disclosure;

FIG. 14 is a diagram illustrating another example of the screen for requesting association between the device result template and the device;

FIG. 15 is a diagram illustrating a screen for selecting the device to be associated with the template according to the embodiments of the present disclosure;

FIG. 17 is a diagram illustrating an example of management of information relating to association between the device setting template and the device according to the embodiments of the present disclosure;

FIG. 18 is a diagram illustrating an example of management of information relating to association between the device setting template and the device according to the embodiments of the present disclosure;

FIG. 19 is a diagram illustrating an example of management of the device selling information set by a change start request according to the embodiments of the present disclosure;

FIG. 20 is a diagram illustrating an example of a display of a device setting change result according to the embodiments of the present disclosure;

FIG. 22 is a diagram illustrating an example of a screen for confirming matching between setting information of the imaging device and the template according to the embodiments of the present disclosure;

FIG. 25 is a diagram illustrating an imaging device settings file according to the embodiments of the present disclosure;

FIG. 28 is a diagram illustrating a modified example of the screen illustrated in FIG. 24;

Figure 1:
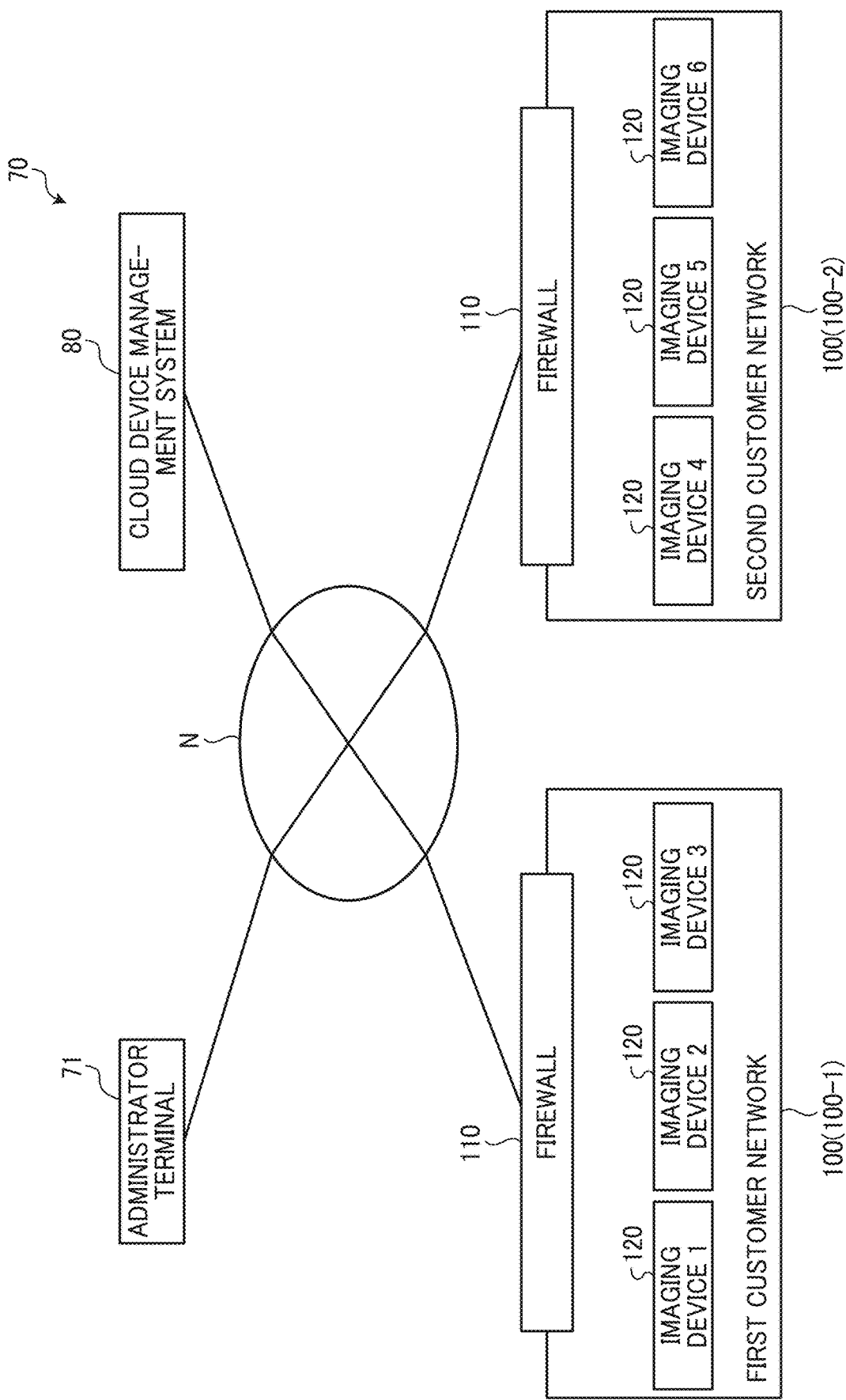
FIG. 1 is a schematic diagram illustrating an example of a configuration of a setting change system according to embodiments of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

An information processing apparatus, system, program, and information processing method are described below with reference to the accompanying drawings.

Figure 2:
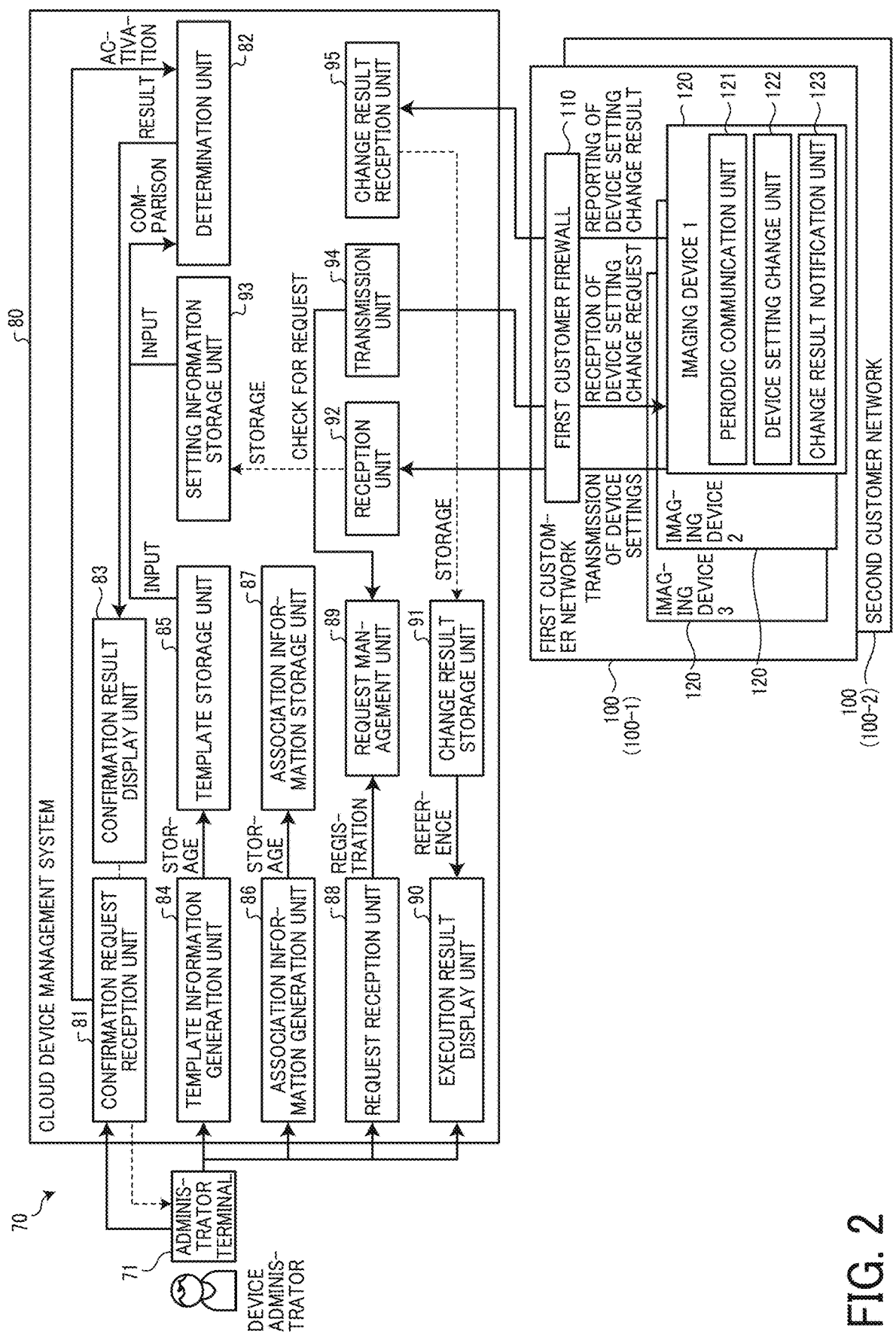
FIG. 2 is a block diagram illustrating an example of the configuration of the setting change system according to the embodiments of the present disclosure.

An outline of the setting change system 70 according to the present embodiment is described. FIG. 1 is a schematic diagram illustrating an example of a configuration of a setting change system 70 according to the present embodiment and FIG. 2 is a block diagram illustrating an example of the configuration of the setting change system 70 according to the present embodiment. The setting change system 70 according to the present embodiment is a system to be used for imaging device management to execute setting changes of a plurality of imaging devices 120. As illustrated in FIGS. 1 and 2, the setting change system 70 includes an administrator terminal 71, a cloud device management system 80, a first customer network 100-1 of a customer 1, and a second customer network 100-2 of a customer 2 connected through a network N. The cloud device management system 80 is an example of an information processing apparatus. Note that the first customer network 1004 and the second customer network 100-2 are referred to as a customer network 100 when not distinguished from each other.

The administrator terminal 71 is a terminal device such as a personal computer (PC). The administrator terminal 71 is a terminal device that is assumed to be operated by a device administrator of the customer 1. The administrator terminal 71 transmits various instructions to the cloud device management system 80.

The cloud device management system 80 is an example of various information processing apparatuses such as a server.

A hardware configuration of the cloud device management system 80 is described in the following.

Figure 4:
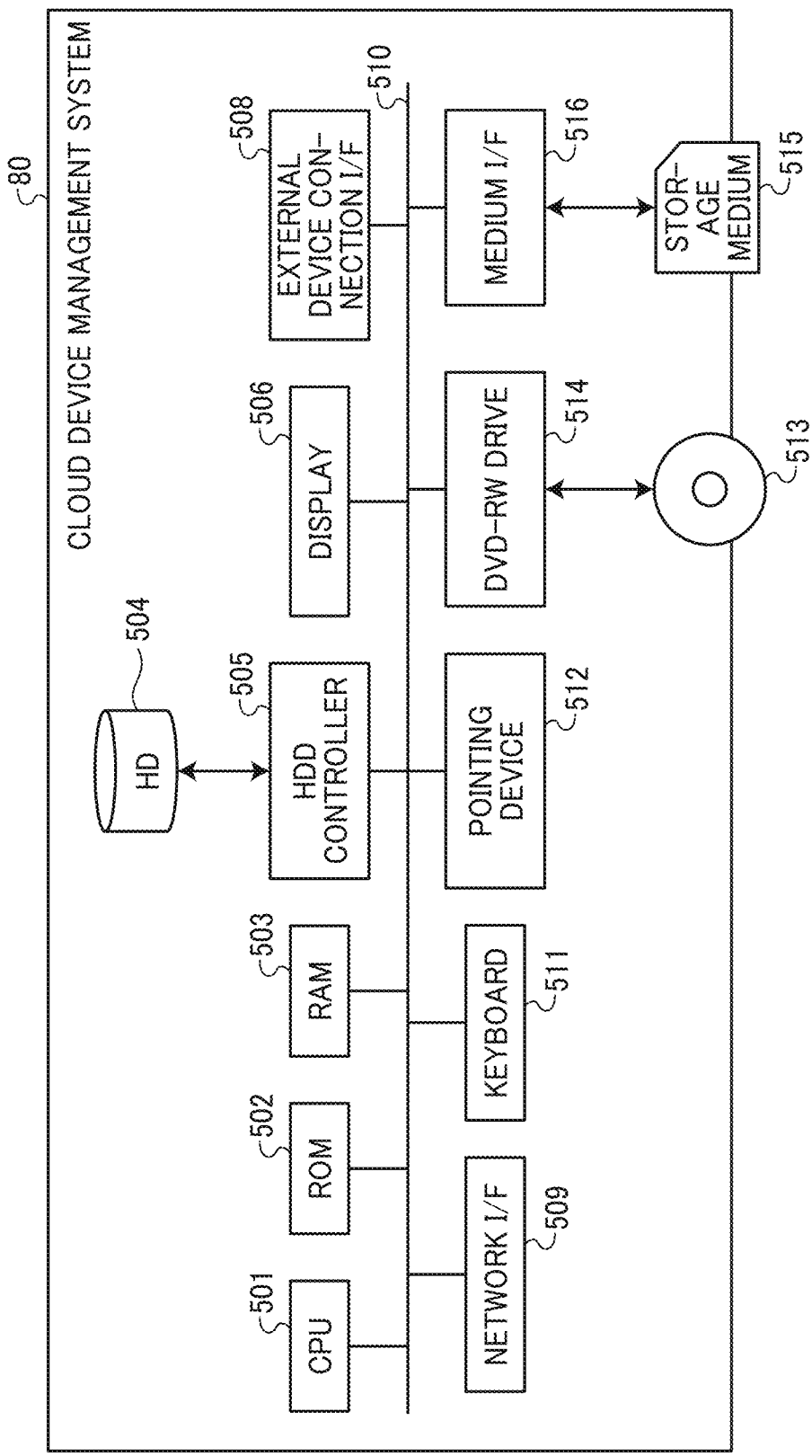
FIG. 4 is a block diagram illustrating a hardware configuration of a cloud device management system.

FIG. 4 is a block diagram illustrating an example of the hardware configuration of the cloud device management system 80. As illustrated in FIG. 4, the cloud device management system 80 is implemented by a computer including a central processing unit (CPU) 501, a read only memory (ROM) 502, a random access memory (RAM) 503, a hard disk (HD) 504, a hard disk drive (HDD) controller 505, a display 506, an external device connection interface (I/F) 508, a network I/F 509, a bus line 510, a keyboard 511, a pointing device 512, a Digital Versatile Disc-Rewritable (DVD-RW) drive 514, and a medium I/F 516.

The CPU 501 controls entire operation of the cloud device management system 80. The ROM 502 stores a control program such as an initial program loader (IPL) to boot the CPU 501.

The RAM 503 is used as a work area for the CPU 501, The HD 504 stores various data such as programs. The HDD controller 505 controls reading and writing of various data from and to the HD 504 under control of the CPU 501. The display 506 displays various information such as a cursor, menu, window, character, or image. The external device connection IT 508 is an interface for connecting various external devices. Examples of the external devices include, but are not limited to, a Universal Serial Bus (USB) memory and a printer. The network IT 509 is an interface for performing data communication using the network N. The bus line 510 is the address bus, the data bus, or the like for electrically connecting each component such as the CPU 501 illustrated in FIG. 4.

The keyboard 511 is an example of an input device provided with a plurality of keys for allowing a user to input characters, numerals, or various instructions. The pointing device 512 is an example of the input device that allows a user to select or execute a specific instruction, select a target for processing, or move a cursor being displayed. The DVD-RW drive 514 reads and writes various data from and to a DVD-RW 513, which is an example of a removable storage medium. The removable storage medium is not limited to the DVD-RW and may be a Digital Versatile Disc-Recordable (DVD-R) or the like. The medium I/F 516 controls reading and writing (storing) of data from and to a storage medium 515 such as a flash memory.

The cloud device management system 80 includes various functions. Specifically, the cloud device management system 80 includes, as various functions, a confirmation request reception unit 81, a determination unit 82, a confirmation result display unit 83, a template information generation unit 84, a template storage unit 85, an association information generation unit 86, an association information storage unit 87, a request reception unit 88, a request management unit 89, an execution result display unit 90, a change result storage unit 91, a reception unit 92, a setting information storage unit 93, a transmission unit 94, and a change result reception unit 95. These various functions are implemented by the CPU 501 of the cloud device management system 80 operating according to the program.

The confirmation request reception unit 81 receives a match confirmation request for confirming that the setting information of the imaging device matches a device setting template.

In response to the match confirmation request, the determination unit 82 checks whether the setting information of the imaging device and the device setting template match. Specifically, the determination unit 82 determines whether device identification information included in communication information (match confirmation request) received from the imaging device is the device identification information associated with association information described below.

The confirmation result display unit 83 displays on the administrator terminal 71 a confirmation result indicating whether a setting template and the setting information of each imaging device associated therewith match.

The template information generation unit 84 receives a device setting template registration request. In response to user input (device setting template registration request) on a template information generation screen (see FIG. 8) displayed on the administrator terminal 71, the template information generation unit 84 generates template information including setting values to be set in the imaging device 120.

The template information generation unit 84 receives a designation whether to set the imaging device 120 in an energy saving priority mode (first mode) in which periodic communication with the cloud device management system 80 is not performed while the imaging device 120 is in the energy saving mode, or to set the imaging device 120 in a device setting change immediate reflection priority mode (second mode) in which periodic communication is performed with the cloud device management system 80 even when the imaging device 120 is in the energy saving mode.

Examples of settings other than the "energy saving priority mode" include "toner save mode", "notification setting", "billing allocation setting", and "history setting".

The template storage unit 85 stores the device setting template generated by the template information generation unit 84.

The association information generation unit 86 receives a request for associating the device setting template and the imaging device. In response to user input (request for associating the device setting template and the imaging device) through an association screen (see FIG. 15) displayed on the administrator terminal 71, the association information generation unit 86 generates association information for associating the generated template information and device identification information for identifying the imaging device 120 among the plurality of imaging devices 120, for setting the setting values included in the template information.

The association information storage unit 87 is an association storage unit that stores the association between the device setting template and the imaging device.

Note that the template information generation unit 84 generates a plurality of pieces of template information based on the input through the template information generation screen. The association information generated by the association information generation unit 86 includes association with device identification information that identifies one or more imaging devices 120 for setting the setting values included in each of the plurality of pieces of template information.

The request reception unit 88 receives a request to start changing the device settings. Specifically, the request reception unit 88 receives from the administrator terminal 71, a setting start request from the administrator to start setting the imaging device 120 based on the device identification information stored in association with the template information and the setting values included in the template information.

The request management unit 89 manages requests for changing device settings.

The execution result display unit 90 transmits and displays the execution result of the device setting change to the administrator terminal 71.

The change result storage unit 91 stores the execution result of the device setting change.

The reception unit 92 receives setting information of the imaging device. Specifically, the reception unit 92 receives communication information (setting information of the imaging device) including device identification information for identifying the imaging device 120 transmitted from the plurality of imaging devices 120, through the network N and the customer network 100.

The setting information storage unit 93 stores the setting information of the imaging device.

The transmission unit 94 transmits a setting request for device settings to the imaging device 120. In response to a reception by the reception unit 92 of the device identification information included in the communication information associated by the association information, the transmission unit 94 transmits to the imaging device 120 that is the transmission source of the communication information through the network N and the customer network 100, the setting request for setting the setting value included in the template information associated with the device identification information in the association information. In response to the reception by the reception unit 92 of the communication information, the transmission unit 94 transmits communication response including the setting request to the imaging device 120 that is the transmission source. Furthermore, in response to receiving the communication information from the imaging device 120 identified by the device identification information associated with the template information based on the setting start request, the transmission unit 94 transmits to the imaging device 120, the setting request for setting the setting values included in the template information associated with the device identification information of the imaging device 120.

The change result reception unit 95 receives from the imaging device 120 an execution result of the device setting request.

A firewall 110 and a plurality of imaging devices 120 reside in the customer network 100. The imaging device 120 is an example of a device including an image processing function, such as a printing device. The imaging device 120 transmits device settings to the cloud device management system 80 through the firewall 110, transmits the result of device setting change, and receives device setting change request from the cloud device management system 80.

The setting change system 70 initiates communication from the imaging device 120 to the cloud device management system 80 to communicate through the firewall residing in the customer network 100. The imaging device 120 is caused to communicate with the cloud device management system 80 periodically, for example, at intervals of five minutes. For example, the imaging device 120 transmits current device settings of own device. In response to communication from the imaging device 120, the cloud device management system 80 confirms whether a setting request for device settings has been received from the administrator terminal 71, and in the case the setting request is received, includes the selling request for the relevant device settings in the response to the communication from the imaging device 120. As described above, the cloud device management system 80 transmits the setting request for device settings to the imaging device 120 residing in the customer network 100 protected by the firewall.

The setting, request for device settings for the imaging device 120 is received from the administrator terminal 71. The customer may prefer to apply the same settings to the plurality of imaging devices 120 that the customer owns. In order for the customer to efficiently implement this request, instead of changing the settings of the devices one by one, changing the settings of the plurality of devices in a single setting change operation is preferred.

In order that the customer's device administrator can enter the settings to be applied to the plurality of devices in one operation through the administrator terminal 71, as a user interface fir receiving the setting request for device settings, a method of inputting settings to be applied to the device from the detail screen of each device is not adopted. Instead, the device administrator enters a "template" of settings that describe the settings to be applied to the plurality of devices through the administrator terminal, association the template to the devices whose settings are to be changed, and finally, the administrator terminal 71 instructs the cloud device management system 80 to change the settings using the template as a starting point. Here, the template is data in which setting values are set for each of a plurality of setting items that can be set for the imaging device 120, and is sometimes referred to as a device setting template below.

The imaging device 120 operates in a plurality of operation modes, including the energy saving priority mode (first mode) and the immediate reflection priority mode (second mode) of the device setting change. A default operation mode of the imaging device 120 is the energy-saving priority mode, and periodic communication with the cloud device management system 80 is not performed in the energy-saving mode. The reason is because power consumption is greater during periodic communication than during the energy saving mode. As a result, while the device is in the energy saving mode, even when the device administrator instructs to change the device settings through the administrator terminal 71, the device setting change is not reflected. However, the device administrator may prefer an operation in which the device setting change is immediately implemented.

For example, the setting change may be preferred to be performed during a period when the device is not in use by anyone. Accordingly, the operation mode of the device is prepared as one of the setting items of the template so that the device can be set in either of the two modes described in FIG. 3.

A hardware configuration of the imaging device 120 is described in the following. In the present embodiment, an example in which the imaging device 120 is a multifunction peripheral (MFP) including at least two functions out of a copy function, a print function, a scan function, and a facsimile function is described, but any image forming apparatus such as a printer, a scanner, a facsimile, and the like is also applicable.

Figure 5:
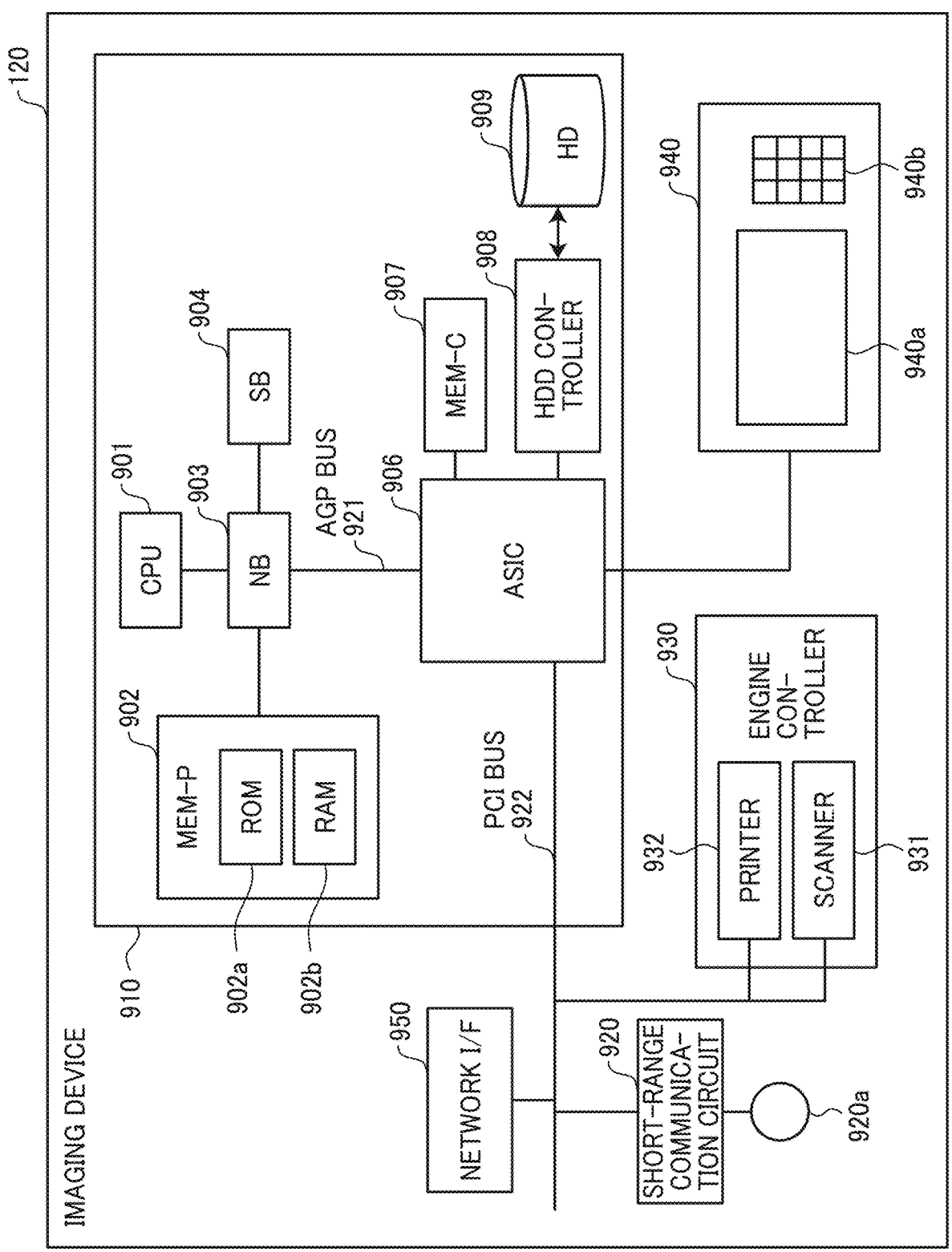
FIG. 5 is a block diagram illustrating a hardware configuration of the imaging device.

FIG. 5 is a block diagram illustrating a hardware configuration of the imaging device 120. As illustrated in FIG. 5, the imaging device 120, which is the MFP, includes a controller 910, a short-range communication circuit 920, an engine controller 930, a control panel 940, and a network interface (I/F) 950.

The controller 910 includes a central processing unit (CPU) 901 as a main processor, a system memory (MEM-P) 902, a north bridge (NB) 903, a south bridge (SB) 904, an Application Specific Integrated Circuit (ASIC) 906, a local memory (MEM-C) 907, a hard disk drive (HDD) controller 908, and a hard disk (HD) 909 as a storage unit. The NB 903 and the ASIC 906 are connected through an Accelerated Graphics Port (AGP) bus 921.

The CPU 901 is a processor that performs overall control of the imaging device 120. The NB 903 connects the CPU 901 with the MEM-P 902. SB 904, and AGP bus 921. The NB 903 includes a memory controller for controlling reading or writing of various data with respect to the MEM-P 902, a Peripheral Component Interconnect (PCI) master, and an AGP target.

The MEM-P 902 includes a ROM 902a as a memory that stores program and data for implementing various functions of the controller 910. The MEM-P 902 further includes a RAM 902b as a memory that deploys the program and data, or as a drawing memory that stores drawing data for printing. The program stored in the ROM 902a may be stored in any computer-readable storage medium, such as a compact disc-read only memory (CD-ROM), compact disc-recordable (CD-R), or digital versatile disc (DVD), in a file format installable or executable by the computer, for distribution.

The SB 904 is a bridge for connecting the NB 903 with a peripheral component interconnect (PCI) device or a peripheral device. The ASIC 906 is an integrated circuit (IC) dedicated to an image processing use, and connects the AGP bus 921, a PCI bus 922, the HDD controller 908, and the MEM-C 907. This ASIC 906 includes a PCI target and AGP master, an arbiter (ARB) that forms the core of the ASIC 906, a memory controller that controls the MEM-C 907, and multiple Direct Memory Access Controllers (DMACs) that rotate image data using hardware logic, and a PCI unit that transfers data between the scanner 931 and the printer 932 through the PCI bus 922. The ASIC 906 may be connected to a USB interface, or an Institute of Electrical and Electronics Engineers 1394 (IEEE1394) interface.

The MEM-C 907 is a local memory used as a buffer for image data to be copied or a code buffer. The HD 909 is a storage that stores image data, font data used during printing, and forms. The HDD controller 908 reads or writes various data from or to the HD 909 under control of the CPU 901. The AGP bus 921 is a bus interface for a graphics accelerator card, which has been proposed to accelerate graphics processing. Through directly accessing the MEM-P 902 by high-throughput, speed of the graphics accelerator card is improved.

The short-range communication circuit 920 is provided with a short-range communication antenna 920a. The short-range communication circuit 920 is a communication circuit that communicates in compliance with Near Field Communication BLUETOOTH (registered trademark) and the like.

The engine controller 930 includes a scanner 931 and a printer 932. The control panel 940 includes a display panel 940a and an operation panel 940b. The display panel 940a is implemented by, for example, a touch panel that displays current settings or a selection screen and receives a user input. The operation panel 940b includes a numeric keypad that receives set values of various image forming parameters such as image density parameter and a start key that accepts an instruction for starting copying. The controller 910 controls the entire imaging device 120, such as drawing, communication, and input from the control panel 940, for example. The scanner 931 or the printer 932 includes image processing functions such as error diffusion processing and gamma conversion processing.

In response to an instruction to select a specific application through the control panel 940, for example, using a mode switch key, the imaging device 120 selectively performs a document box function, a copy function, a print function, and a facsimile function. The document box mode is selected when the document box function is selected, the copy mode is selected when the copy function is selected, the print mode is selected when the print function is selected, and the facsimile mode is selected when the facsimile function is selected.

The network I/F 950 is an interface for data communication using the network N and customer network 100. The short-range communication circuit 920 and the network I/F 950 are electrically connected to the ASIC' 906 through the PCI bus 922.

The imaging device 120 includes various functions. Specifically, the imaging device 120 includes a periodic communication unit 121, a device setting change unit 122, and a change result notification unit 123 as functions. These various functions are implemented by the CPU 901 of the imaging device 120 operating according to programs.

The periodic communication unit 121 periodically communicates with the cloud device management system 80 and checks whether the selling request is included in the communication response.

The device setting change unit 122 changes device settings based on the setting content included in the setting request received from the cloud device management system 80.

For example, in a case the template information received from the cloud device management system 80 designates, the energy-saving priority mode (first mode) in which the periodic communication with the cloud device management system 80 is prohibited while the imaging device 120 is in the energy-saving mode as a setting item, the device setting change unit 122 changes the setting so that the periodic communication with the cloud device management system 80 is prohibited in the energy saving mode, and in a case the immediate reflection priority mode (second mode) of the device setting change is designated, the device setting change unit 122 changes the setting so that the periodic communication to the cloud device management system 80 is performed even in the energy saving mode.

The change result notification unit 123 notifies the cloud device management system 80 of the device setting execution result.

Figure 6:
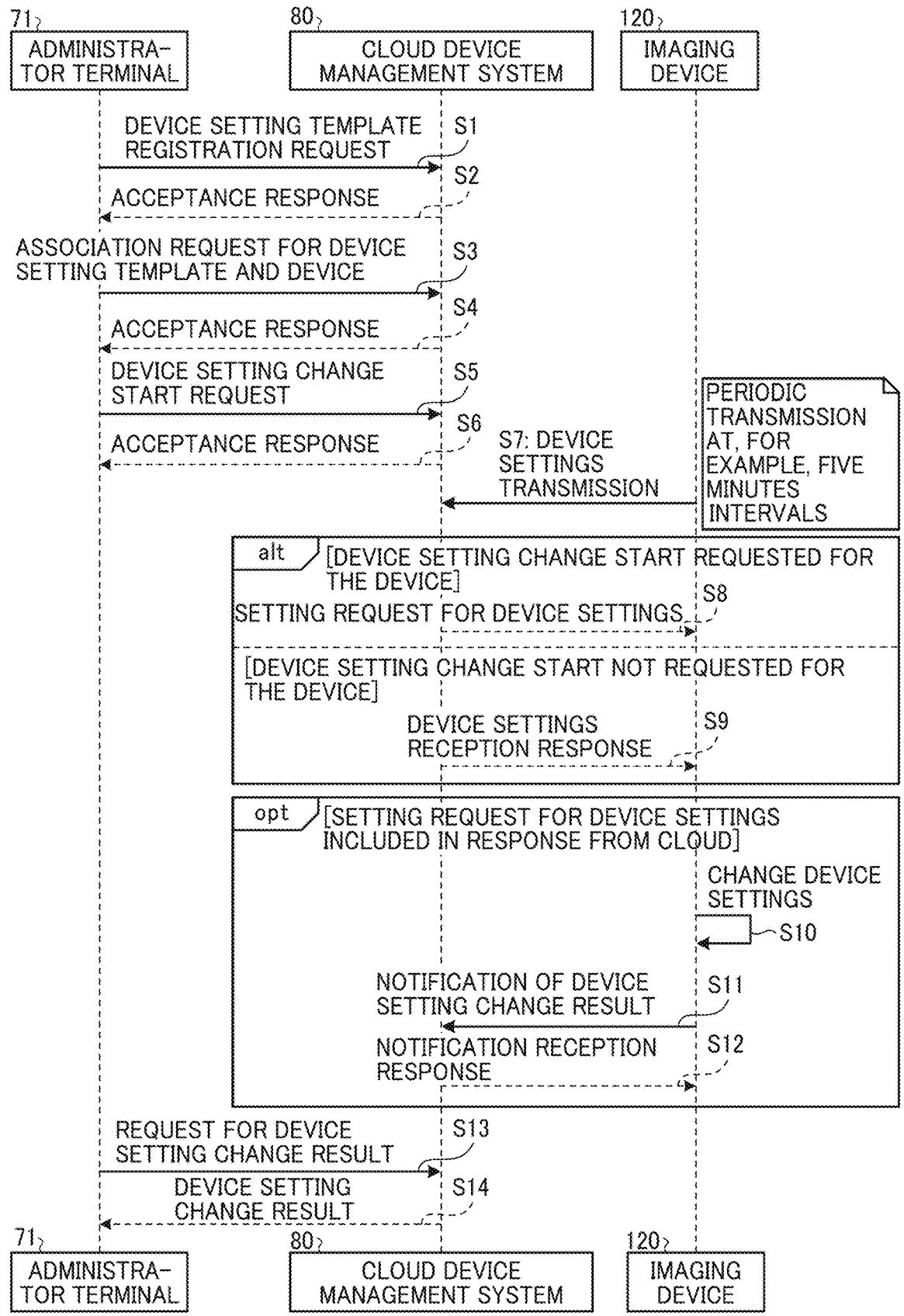
FIG. 6 is a sequence diagram illustrating a process executed by the setting change system according to the embodiments of the present disclosure.

A setting change process executed by the setting change system 70 according to the present embodiment is described using a sequence diagram illustrated in FIG. 6.

In step S1, the administrator terminal 71 requests the cloud device management system 80 to register the device setting template. In response to the request, the cloud device management system 80 transmits an acceptance response to the administrator terminal 71 in step S2.

Figure 8:
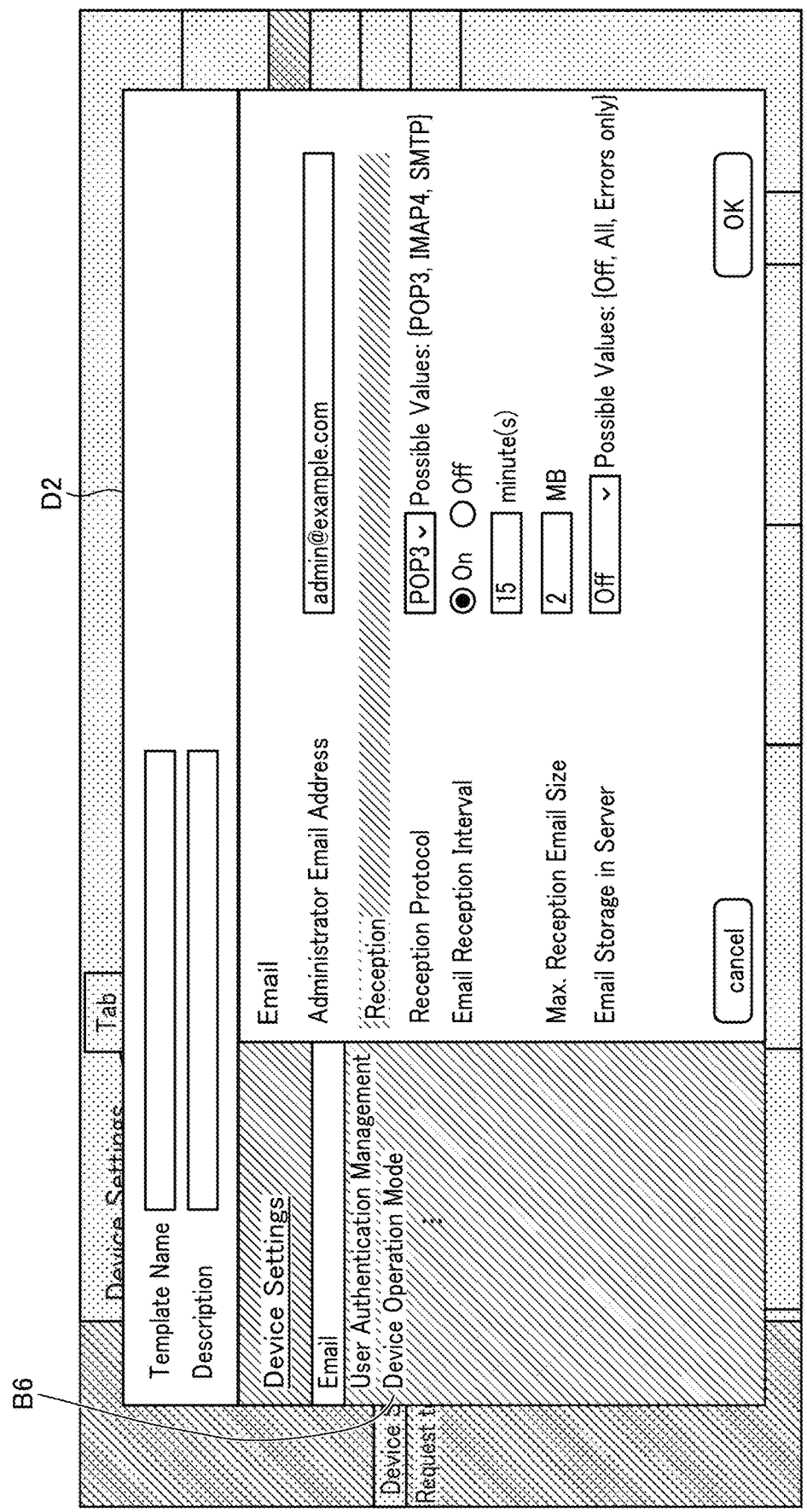
FIG. 8 is a diagram illustrating an example of a screen for template registration according to the embodiments of the present disclosure.

FIG. 7 is a diagram illustrating an example of a screen for requesting registration of the device setting template. The cloud device management system 80 outputs a screen D1 illustrated in FIG. 7 in response to the device setting template registration request. In response to a selection of a "Create Template" button B5 on the screen D1 illustrated in FIG. 7, the cloud device management system 80 (template information generation unit 84) outputs to the administrator terminal 71, a screen for template registration (template information generation screen D2) as illustrated in FIG. 8. On the screen D1 illustrated in FIG. 7, setting values can be changed by selecting a desired template from the created templates.

Figure 9:
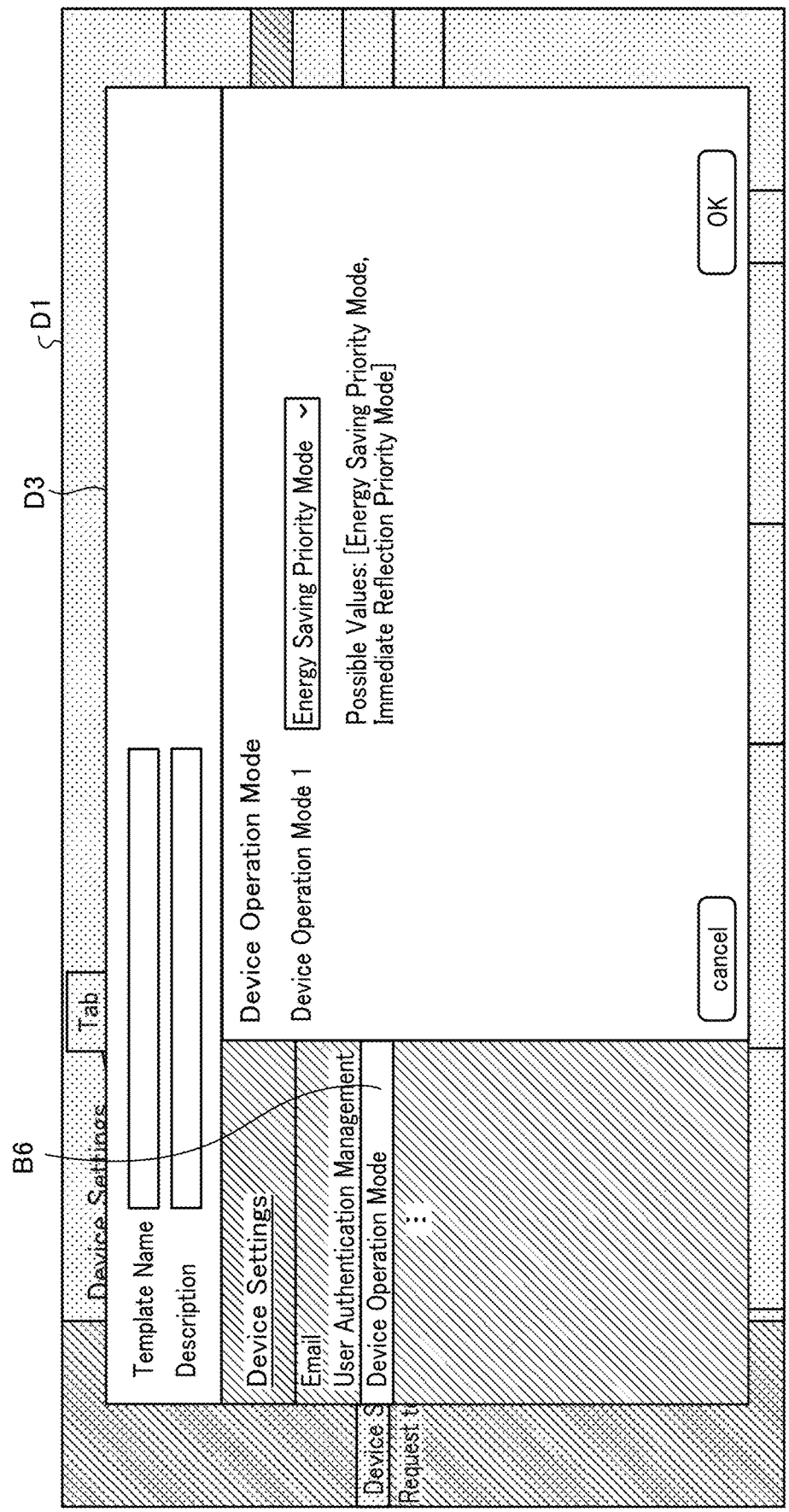
FIG. 9 is a diagram illustrating another example of the screen for template registration according to the embodiments of the present disclosure.

As illustrated in FIG. 8, the template information generation screen D2 is a screen on which the initial values of the respective setting items of the imaging device 120 are displayed in a changeable manner. On the template information generation screen D2 illustrated in FIG. 8 displayed on the administrator terminal 71, the setting values for the imaging device 120 is set as template information based on input for each of a plurality of setting items. As illustrated in FIG. 8, the template information generation screen D2 allows input of template information such as a template name and protocol. The template information includes setting items and setting values of the imaging device 120 including communication settings, protocols, operation modes, mail settings, history management, print settings, and the like. In response to a selection of a "Device Operation Mode" button B6, the cloud device management system 80 outputs a template registration screen D3 illustrated in FIG. 9. As illustrated in FIG. 9, the operation mode can be selected and set as a template setting item, FIG. 10 is a diagram illustrating an example of a device setting template file. FIG. is a diagram illustrating the device setting template file expressed in JavaScript Object Notation (JSON). Note that the expression method is not limited to JSON, and may be Extensible Markup Language (XML) or Comma-Separated. Values (CSV).

The cloud device management system 80 stores the created device setting template. FIG. 11 is a diagram illustrating an example of management of the device setting template. As illustrated in FIG. 11, the cloud device management system 80 manages information in which a customer identifier (ID), template ID, template name, description, storage location, last updater, and last update date and time are associated with each other.

Returning to FIG. 6, in step S3, the administrator terminal 71 requests the cloud device management system 80 to associate the device setting template with the device. In response to the request, the cloud device management system 80 transmits an acceptance response to the administrator terminal 71 in step S4.

Figure 13:
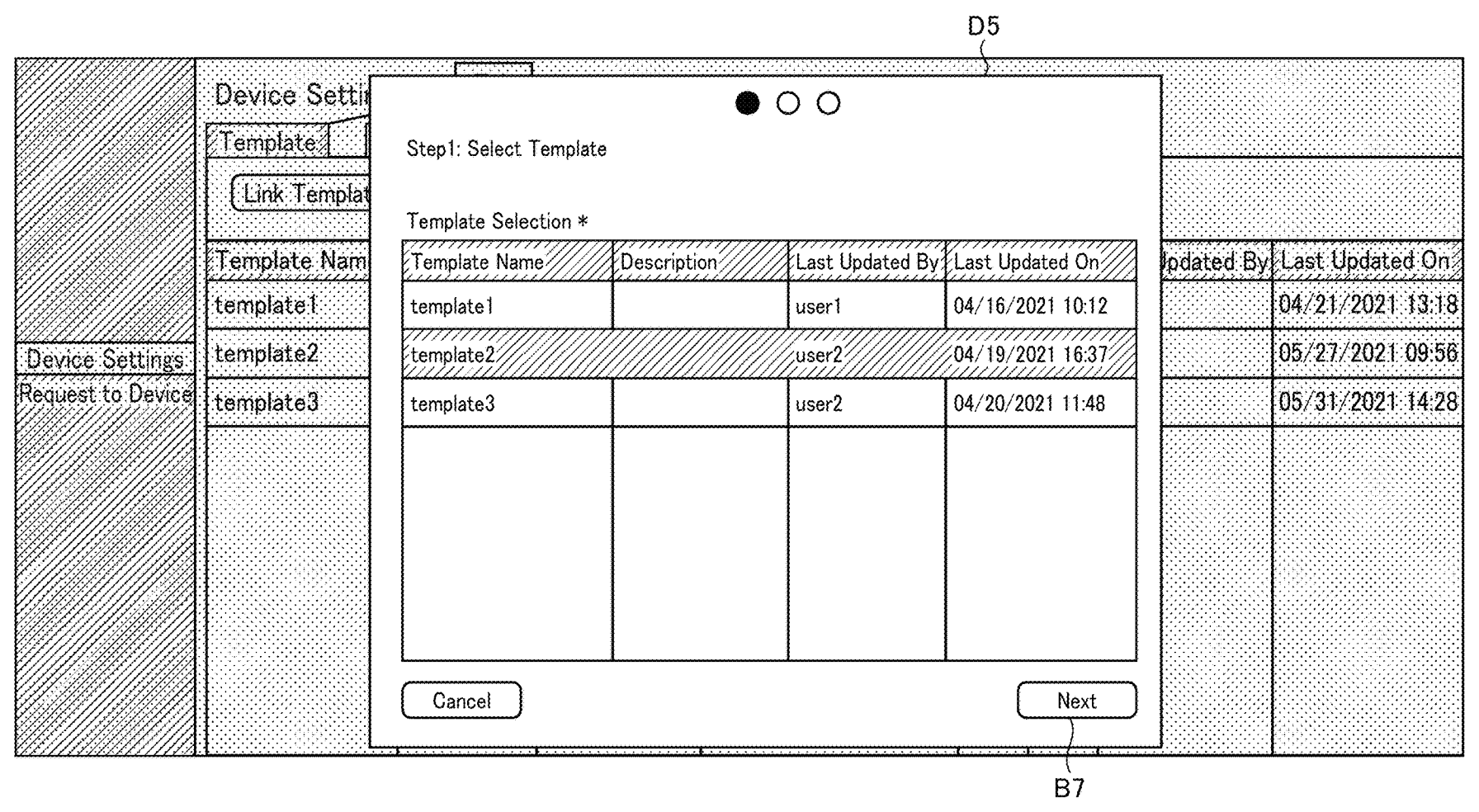

FIG. 12 is a diagram illustrating an example of a screen for requesting association between a device result template and the device. The cloud device management system 80 outputs a screen D4 illustrated in FIG. 12 in response to the request to associate the device setting template with the device. In response to a selection of the "Associate Template and Device" button 131 on the screen D4 illustrated in FIG. 12, the cloud device management system 80 (association information generation unit 86) outputs a template selection screen D5 as illustrated in FIG. 13. The template selection screen D5 as illustrated in FIG. 13 displays a list of the templates created and stored in step S1.

A modified example of the screen for requesting association between the device result template and the device is described in the following. FIG. 14 is a diagram illustrating another example of the screen for requesting association between the device result template and the device. As illustrated in FIG. 14, in response to a selection of the "Start Setting" button B2 on the screen DO illustrated in FIG. 14, the cloud device management system 80 (association information generation unit 86) notifies the user of a timing of transmission to the transmission source imaging device 120, of the setting request for setting the setting value included in the template information associated with the identification information for identifying the imaging device 120, in the case the identification information of the imaging device 120 that transmitted the communication information is the identification information associated by the association information. In the example illustrated in FIG. 14, after the "Start Setting" button B2 is pressed, the processes after step S5, which are described below, are executed, and time T for completing the setting change is displayed in a countdown (hh:mm), as the timing of transmission to the imaging device 120.

Figure 15:
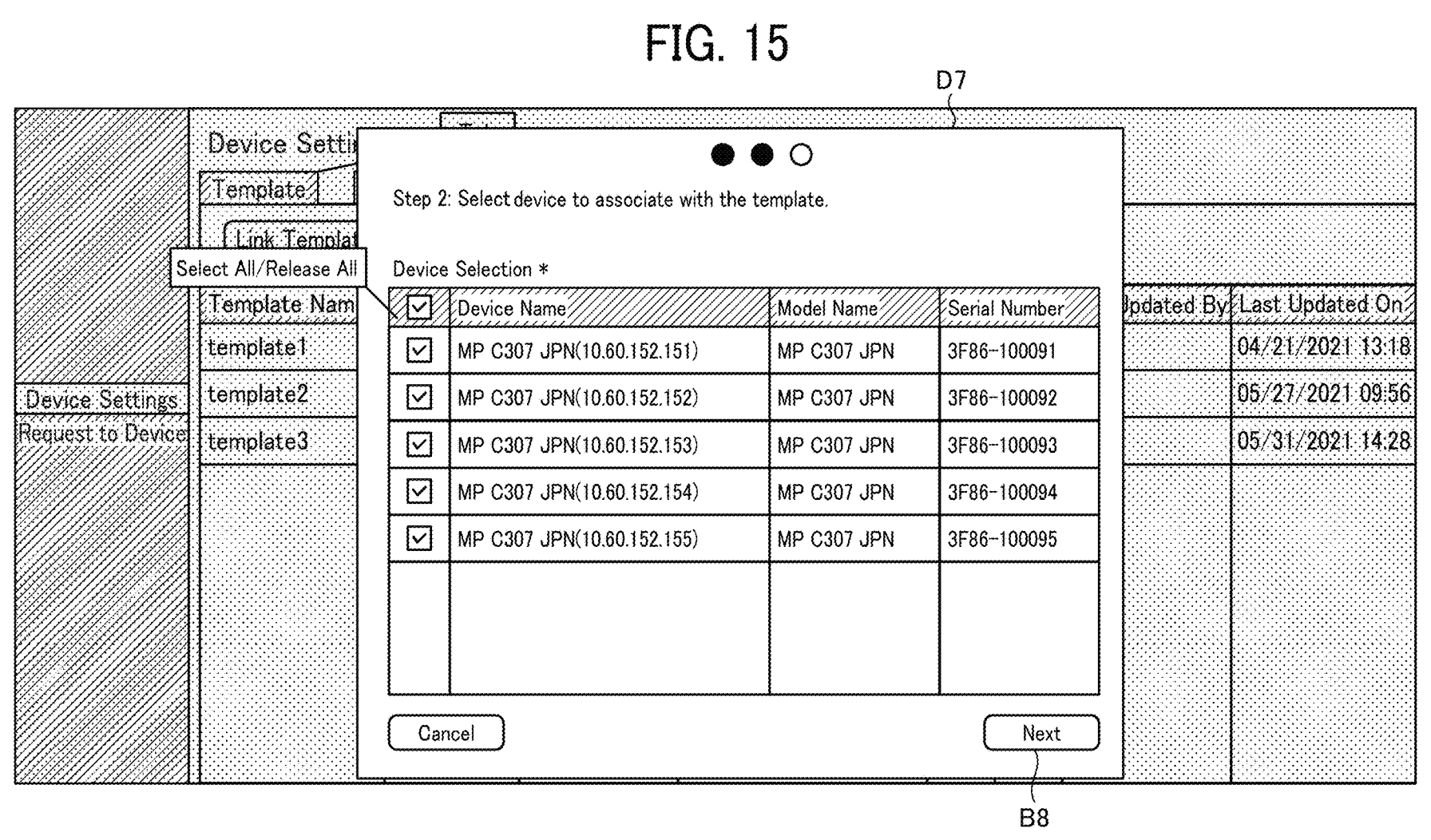

In response to a pressing of a "Next" button B7 illustrated in FIG. 13, the cloud device management system 80 (association information generation unit 86) outputs a screen for selecting one or more devices as devices to be associated with a template (association screen D7) as illustrated in FIG. 15. Here, a list of the imaging devices 120 owned by the customer is displayed on the screen (association screen) D7 for selecting one or more devices to be associated with the template as illustrated in FIG. 15. The cloud device management system 80 (association information generation unit 86) receives registration of the imaging device 120 in advance through the administrator terminal 71 or the imaging device 120. Instead of receiving a selection of the imaging device 120, the cloud device management system 80 (association information generation unit 86) may specify the imaging device 120 by receiving input of a command number or address of the imaging device 120 from the administrator terminal 71.

Based on user input through the association screen D7 illustrated in FIG. 15 displayed on the administrator terminal 71, the cloud device management system 80 (association information generation unit 86) generates the association information for associating the generated template information and the device identification information for identifying the imaging device 120 for setting the setting value included in the template information among the plurality of imaging devices 120.

Figure 16:
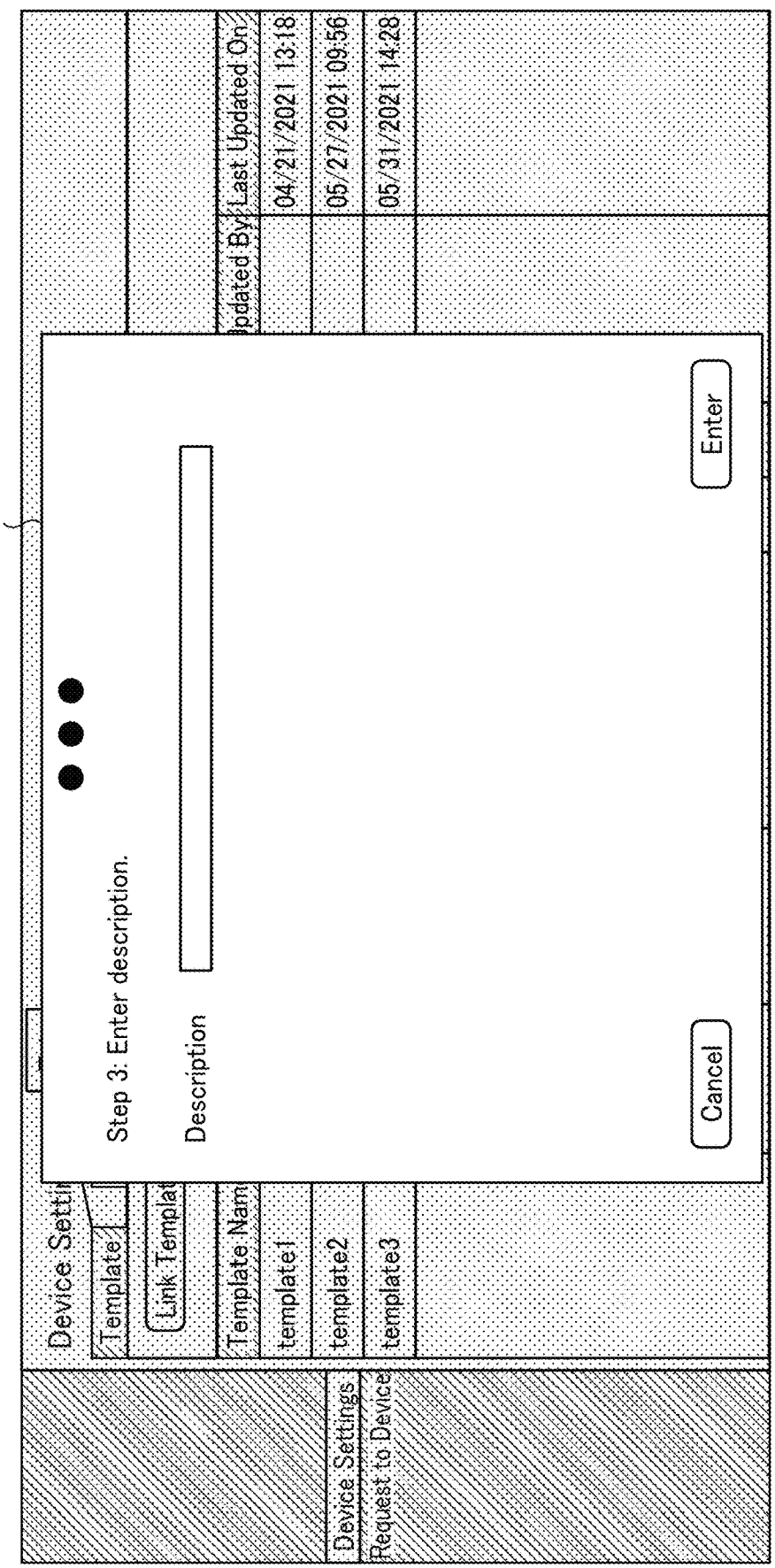
FIG. 16 is a diagram illustrating the screen for selecting the device to be associated with the template according to the embodiments of the present disclosure.

In response to a pressing of the "Next" button 138 illustrated in FIG. 15, the cloud device management system 80 outputs a screen D8 for inputting a description as illustrated in FIG. 16. The screen D8 receives the description related to the template input by text data. In other words, according to the pressing of the "Next" button B7 illustrated in FIG. 13 and the pressing of the "Next" button 138 illustrated in FIG. 15, the screen transitions to the screens illustrated in FIGS. 13, 15, and 16.

When the device result template and the device are associated, the cloud device management system 80 stores information related to the association between the device setting template and the device. FIGS. 17 and 18 are diagrams illustrating examples of management of information related to association between the device setting template and the device. As illustrated in FIG. 17, the cloud device management system 80 manages information that associates a template and device association ID, template ID, device ID, last updater, and last update date and time. In addition, as illustrated in FIG. 18, the cloud device management system 80 manages information that associates the template and device association ID, description, last updater, and the last update date and time. Note that the template can be managed in association with a plurality of device IDs.

Returning to FIG. 6, in step S5, the administrator terminal 71 issues a device setting change start request (setting start request) to the cloud device management system 80. In response to the device setting change start request, the cloud device management system 80 transmits an acceptance response to the administrator terminal 71 in step S6. Here, the cloud device management system 80 may select the template for changing the device settings. Further, after the process of associating the device setting template with the device, the device setting change may be started automatically. In other words, the request for associating the device setting template and the device may be regarded as the change start request. In this case, the processing of steps S5 and S6 may be omitted.

FIG. 19 is a diagram illustrating an example of management of the device setting information set by a change start request. The cloud device management system 80 manages, as illustrated in FIG. 19, a request ID to the imaging device 120, a device ID that is the serial ID of the imaging device 120, a request type, a template ID, a status, a requester, a start date and time when the change start request is received, and setting change completion date and time, in association with each other. For example, in response to receiving the selection of template as a change start request, the template ID of the selected template and the device IDs of one or more imaging devices 120 associated with the selected template are set as the device identification information set by the device setting change start request. In a case the request for associating the device setting template and the device is regarded as the change start request, the template ID of the created template and the device IDs of one or more imaging devices 120 associated with the created template are set as the device identification information set by the device setting change start request.

The device identification information is not limited to the device ID, which is the serial ID of the imaging device 120, and may be any one of the manufacturing number, Internet Protocol (IP) address, and Media Access Control (MAC) address.

Returning to FIG. 6, in step S7, the imaging device 120 periodically transmits device settings to the cloud device management system 80 at, for example, five minutes intervals. The device settings include the setting information set in the imaging device 120. For example, the device settings include setting values for each setting item that can be set in the template. Further, the device settings may include the device ID as device identification information for identifying the imaging device 120. Note that the transmission of the device settings from the imaging device 120 to the cloud device management system 80 may be expressed as communication.

In step S8, the cloud device management system 80 (transmission unit 94), in a case the change start request to the imaging device 120 of the transmission source is received, requests the imaging device 120 of the transmission source to set device settings. Here, the setting request includes a setting value for each setting item set in the device setting template. In a case the change start request to the imaging device 120 of the transmission source is not received, the cloud device management system 80 responds in step S9, that the device settings have been received.

As described above, the cloud device management system 80 (transmission unit 94) periodically performs polling to inquire whether there is data to be transmitted to the imaging device 120 at, for example, five minutes intervals. The cloud device management system 80 (transmission unit 94) includes the setting request obtained by polling in the communication response in the next polling and transmits the same to the imaging device 120 that is the transmission source.

Note that in a case the device identification information of the imaging device 120 that has transmitted the communication information is included in both one or more imaging devices 120 related to one template information and one or more imaging devices 120 related to another template information, the cloud device management system 80 (transmission unit 94) transmits to the imaging device 120 that is the transmission source, a setting request for setting either the setting value included in one template information or the setting value included in another template information, based on a predetermined condition. The predetermined condition is either (1) among the plurality of pieces template information, the template information with older date and time when the association information was generated or updated is applied, or (2) the template information with newer date and time when association information is generated or updated among a plurality of pieces of template information is applied.

The cloud device management system 80 (determination unit 82) refers to the information set by the device setting change start request, and determines that there is a change start request in a case the device ID received from the imaging device 120 is included, and determines that there is no change start request in a case the device ID received from the imaging device 120 is not included. In other words, the determination unit 82 determines whether the device ID included in the received communication information is the device ID associated by the association information. Here, even when the device ID received from the imaging device 120 is included in the information set by the device setting change start request, in a case the status is completed, a determination is made that there is no change start request. Further, the cloud device management system 80 (determination unit 82) may not issue a change start request in a case the setting value included in the device settings received from the imaging device 120 match the setting values set in the device setting template.

In response to receiving the setting request for device settings from the cloud device management system 80, the imaging device 120 changes the device settings accordingly in step S10, and notifies the change result of the device settings in step S11. In step S12, the cloud device management system 80 transmits a notification reception response. The cloud device management system 80 stores a result of changing the device settings as a device setting change result. Based on a confirmation that the setting change in the imaging device 120 has been normally completed according to the device setting change result, the cloud device management system 80 changes the status to completed in the information set by the device setting change start request and the date and time when the change result is received is stored as the completion date and time.

In step S13, the administrator terminal 71 requests the change result of the device settings at a predetermined timing. In step S14, the cloud device management system 80 transmits the device setting change result.

FIG. 20 is a diagram illustrating an example of a screen displaying the device setting change result. As in the screen D9 illustrated in FIG. 20, the cloud device management system 80 displays information including a device name, a model name, a serial number (serial number of imaging device), a task content, an information type, a status, a description, a requester, a start date and time, and a completion date and time.

A match confirmation process executed by the setting change system 70 according to the present embodiment is described with reference to a sequence diagram illustrated in FIG. 21.

As an example, assume that 10 devices are associated with a setting template. The administrator terminal 71 issues an instruction to start changing the settings, and the settings of all 10 devices are changed according to the template. However, a device user may change the settings of the imaging device by directly operating the device. This setting change is a preference of the device user, and the device user may not restore the settings after using the device.

Figure 21:
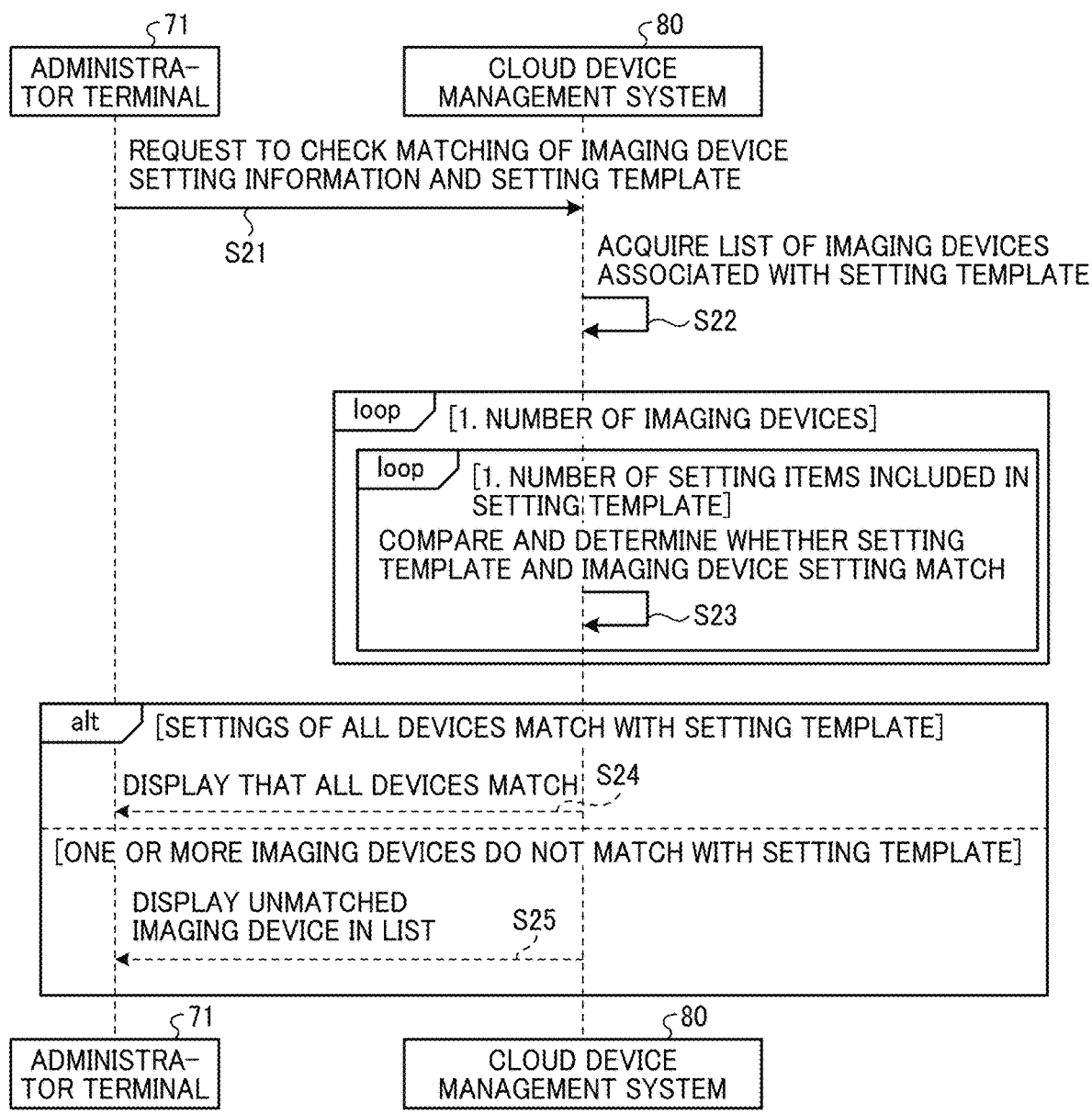
FIG. 21 is a sequence diagram illustrating a match confirmation process executed by the setting change system according to the embodiments of the present disclosure.

In the cloud device management system 80, based on the sequence illustrated in FIG. 21, the customer's device administrator checks through the administrator terminal 71 whether the settings of each device associated with the template match the template.

In step S21, the administrator terminal 71 transmits to the cloud device management system 80, a request to confirm that the setting information of the imaging device 120 matches the device setting template.

FIG. 22 is a diagram illustrating an example of a screen for confirming matching between the setting information of the imaging device and the template. On the screen D10 illustrated in FIG. 22, in response to a selection of a "Check Settings Match" button B9, matching confirmation between the setting information of the imaging device 120 and the setting template is started for a corresponding template. In step S22, the cloud device management system 80 acquires a list of imaging devices associated with the setting template.

In step S23, the cloud device management system 80 compares whether the setting template and the setting value of the imaging device match for the number of the imaging devices 120. For example, the cloud device management system 80 compares the setting values included in the device settings received from the imaging device 120 with the setting values set in the device setting template for each imaging device 120, and determines whether the setting values match.

Figure 23:
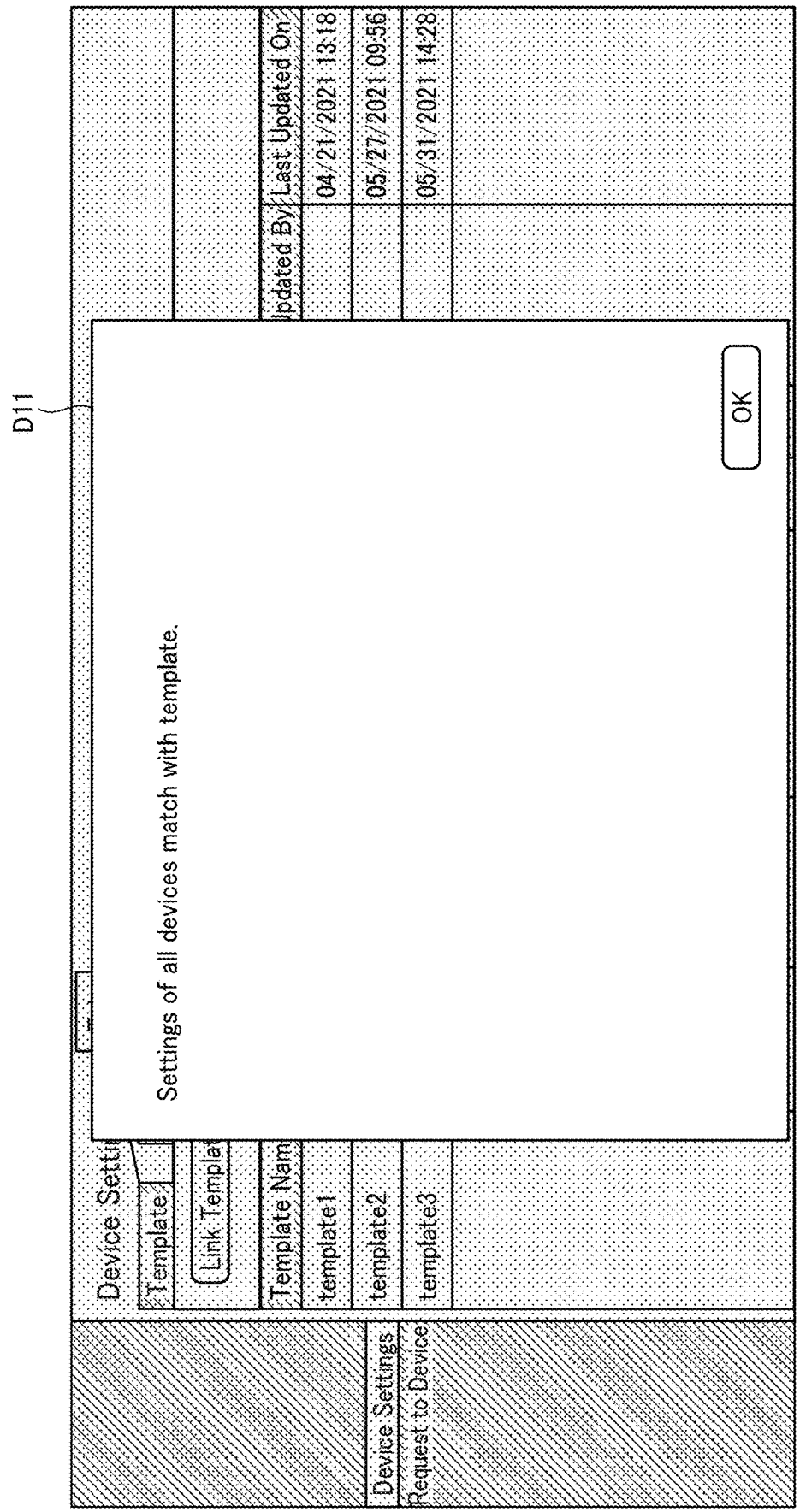
FIG. 23 is a diagram illustrating an example of a screen for presenting a result of confirming matching between the setting information of the imaging device and the template according to the embodiments of the present disclosure.

In step S24, when all the devices match, the cloud device management system 80 outputs a display to the administrator terminal 71 indicating that all the devices matches. The cloud device management system 80 displays, for example, a screen D11 as illustrated in FIG. 23.

Figure 24:
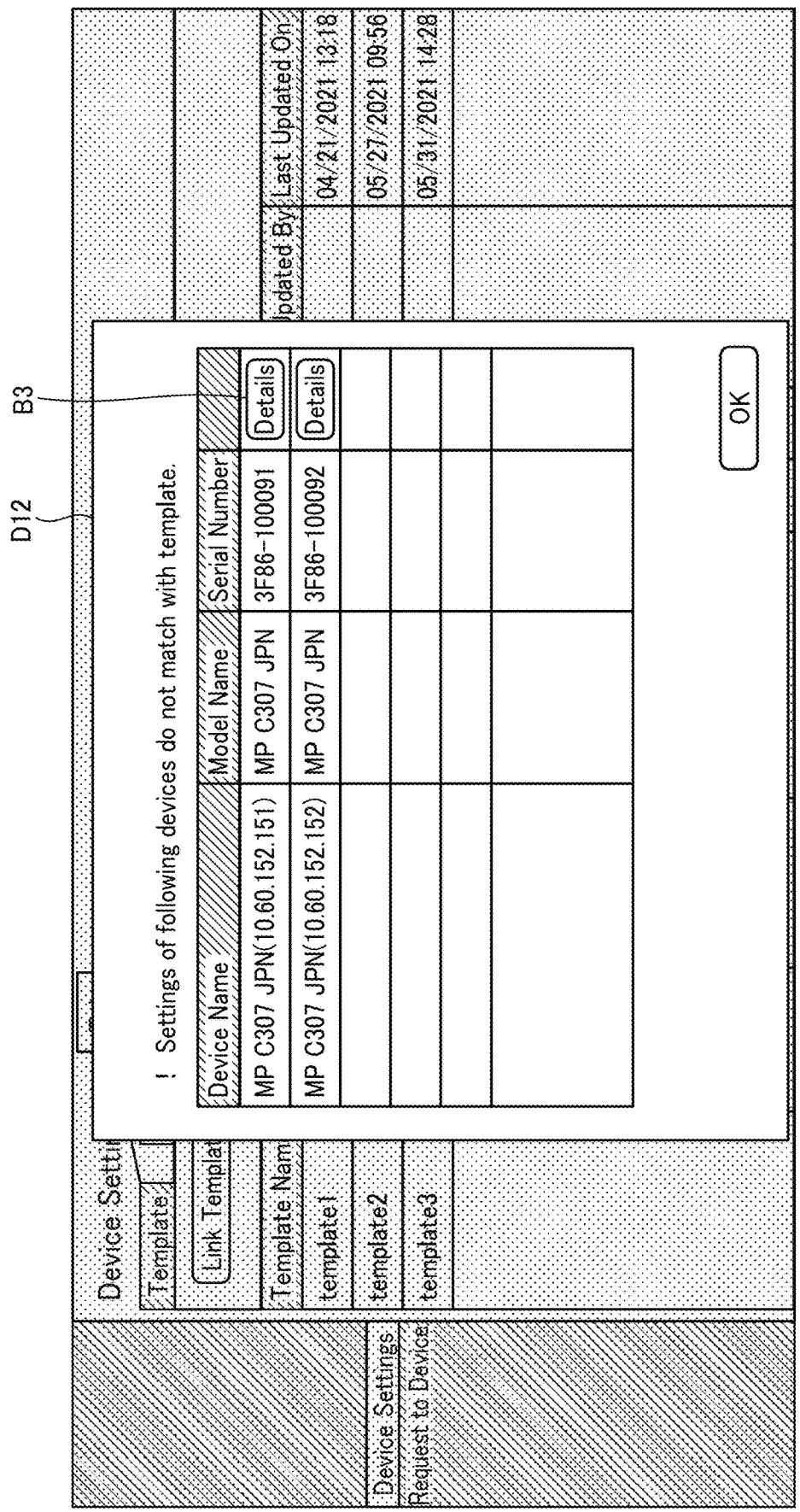
FIG. 24 is a diagram illustrating an example of a screen for presenting a result of confirming matching between the setting information of the imaging device and the template according to the embodiments of the present disclosure.

In step S25, when one or more of the devices do not match, the cloud device management system 80 displays a list of imaging devices that do not match. The cloud device management system 80 displays, for example, a screen D12 as illustrated in FIG. 24. Note that the setting information of the imaging device 120 is expressed in JSON as illustrated in FIG. 25.

Figure 26:
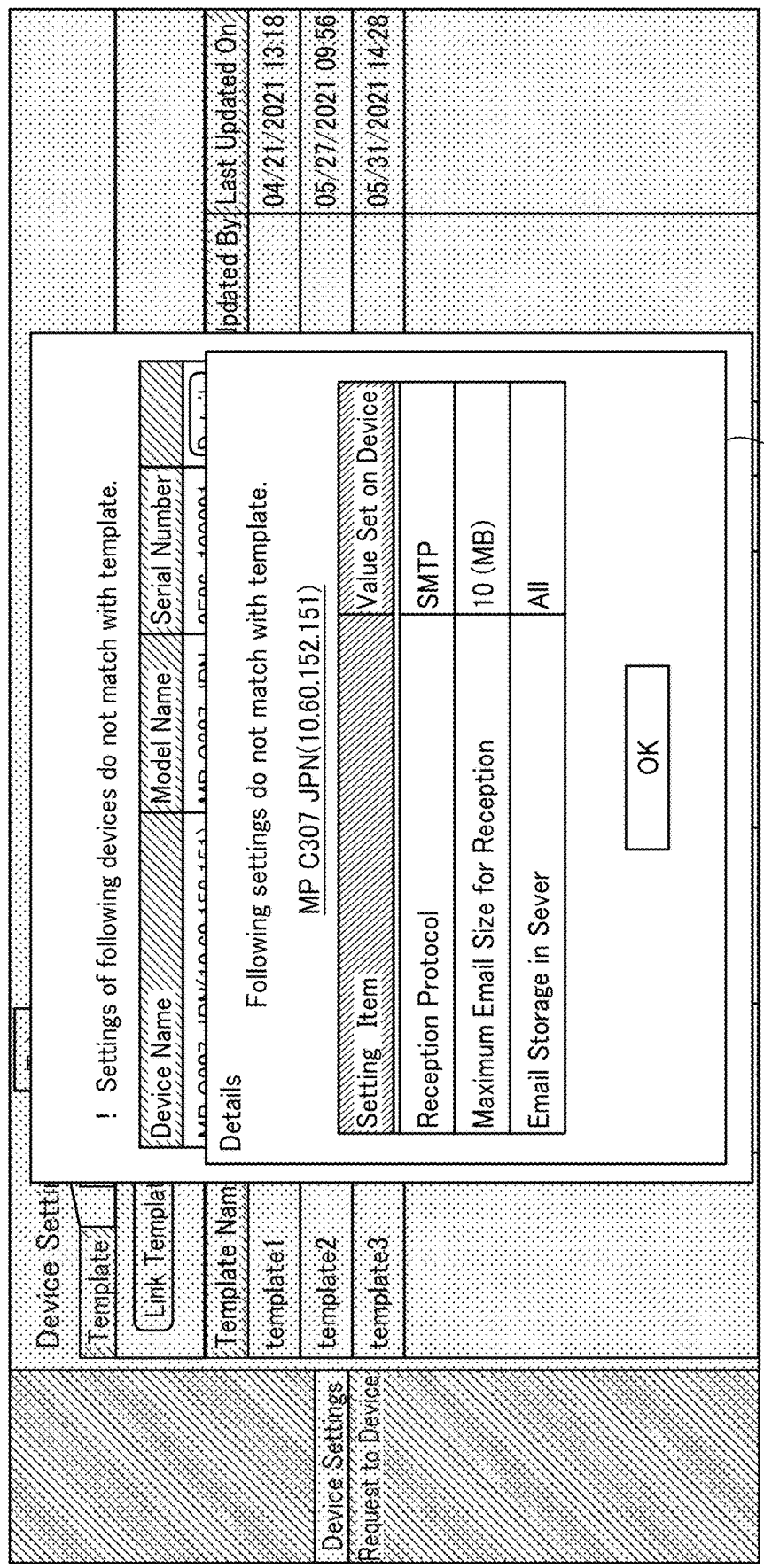
FIG. 26 is a diagram illustrating an example of a pop-up displayed in response to a pressing of a detail button on the screen illustrated in FIG. 24.

FIG. 26 is a diagram illustrating an example of a pop-up displayed in response to a pressing of a "Details" button B3 on the screen D12 illustrated in FIG. 24. As illustrated in FIG. 26, in response to the pressing of the "Details" button B3 on the screen D12 illustrated in FIG. 24, the cloud device management system 80 displays a list of setting values that do not match the template information on a popup screen D13.

Figure 27:
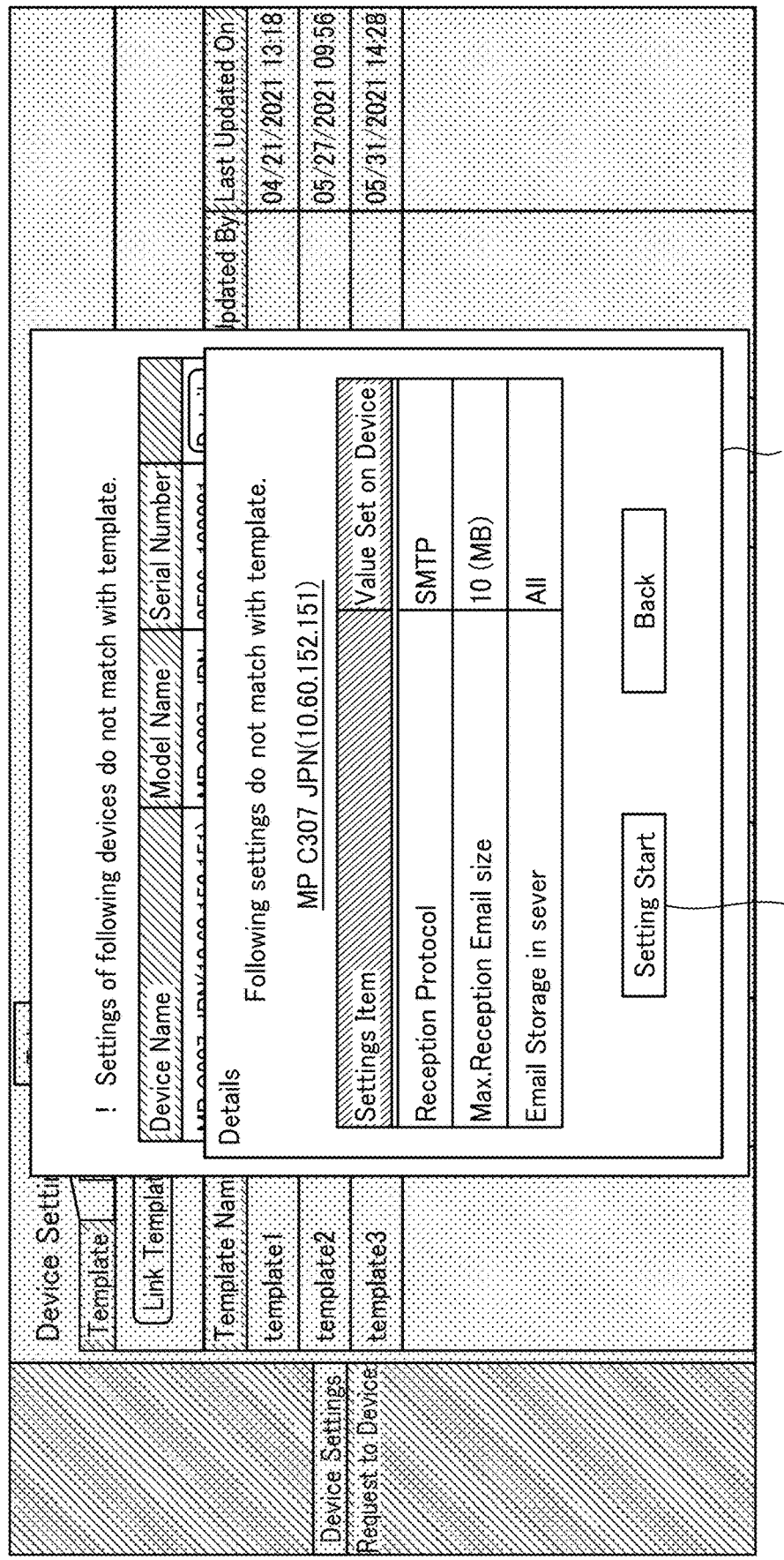
FIG. 27 is a diagram illustrating another example of the pop-up displayed in response to the pressing of the detail button on the screen illustrated in FIG. 24.

FIG. 27 is a diagram illustrating an example of a pop-up displayed in response to a pressing of the "Details" button B3 on the screen D12 illustrated in FIG. 24. As illustrated in FIG. 27, in response to a pressing of the "Details" button B3 on the screen D12 illustrated in FIG. 24, the cloud device management system 80 displays a list of setting values that do not match the template information on a pop-up screen D14, and displays a "Setting Start" button B4 for starting the setting change on the pop-up screen D14. In response to the pressing of the "Setting Start" button B4, the cloud device management system 80 executes the processes after step S5 described above, and displays a screen that allows setting of setting values.

FIG. 28 is a diagram illustrating a modified example of the screen D12 illustrated in FIG. 24. As illustrated in FIG. 28, the cloud device management system 80 may display the "Setting Start" button B4 for starting the setting on the screen 1712 illustrated in FIG. 24.

Figure 29:
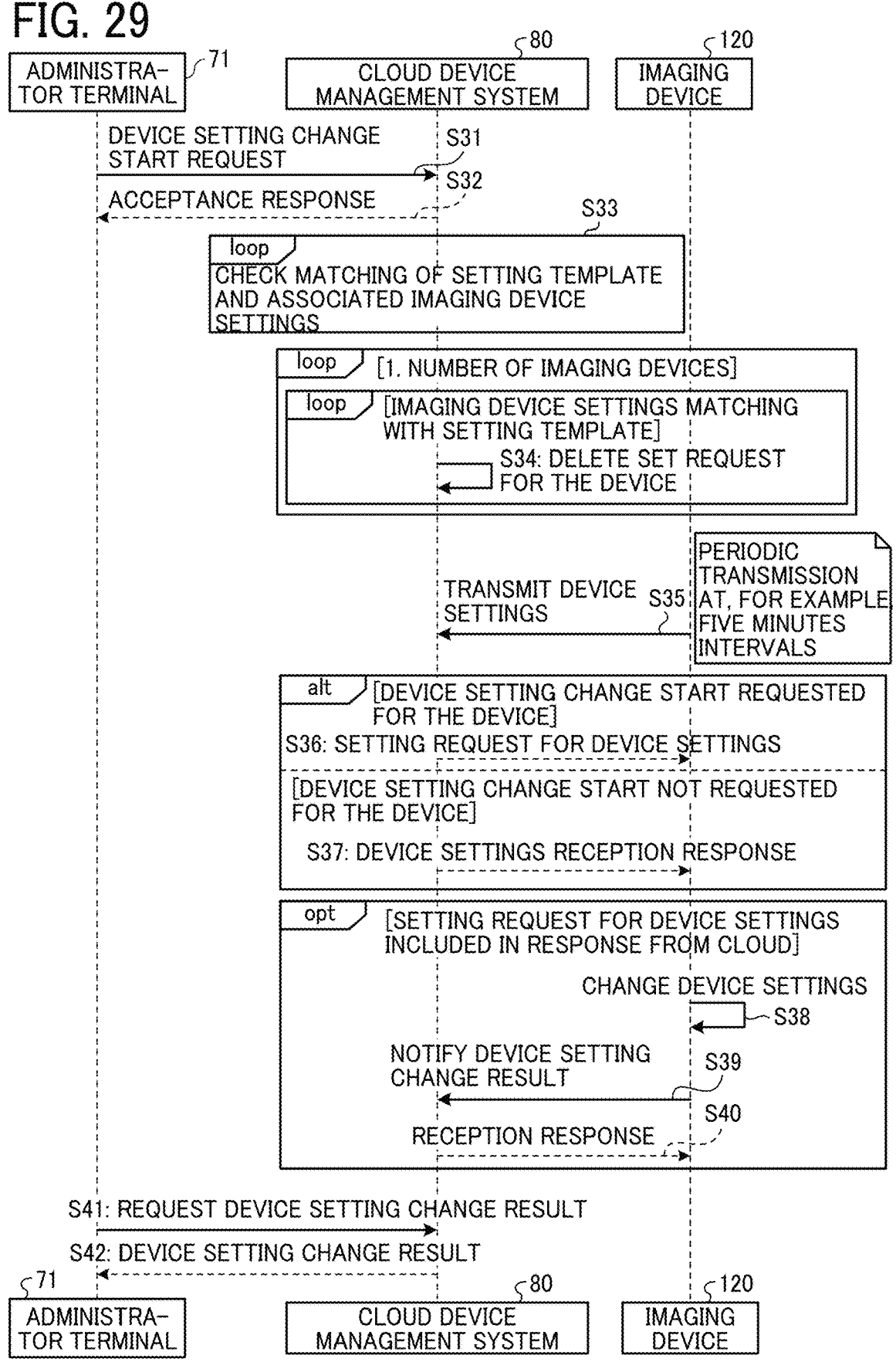
FIG. 29 is a sequence diagram illustrating a setting change process of the imaging device according to the embodiments of the present disclosure.

A setting change process executed by the imaging device 120 is described with reference to the sequence illustrated in FIG. 29.

As an example, assume that there are 10 imaging devices 120 in total, and the settings of two out of the 10 imaging devices do not match the template. The administrator terminal 71 transmits the setting change start request to the cloud device management system 80, and the cloud device management system 80 transmits the setting request for the device settings to the two devices concerned. The administrator terminal 71 does not transmit the setting request for device settings to the remaining eight devices whose settings match the template. As a result, unnecessary setting changes of the imaging device is prevented.

In step S31, the administrator terminal 71 requests the cloud device management system 80 to start changing device settings. In response to the request, the cloud device management system 80 transmits an acceptance response to the administrator terminal 71 in step S32.

In step 533, the cloud device management system 80 confirms whether the setting template matches the settings of the imaging device 120 associated with the setting template. In step S34, the cloud device management system 80 deletes the setting request for the imaging device 120 for which the settings match the selling template. Note that the process of step S34 is performed for each imaging device 120.

In step S35, the imaging device 120 periodically transmits device settings to the cloud device management system 80 at, for example, five minutes intervals.

In step 536, the cloud device management system 80 requests the transmission source imaging device 120 to set the device settings for the transmission source imaging device 120 that has the change start request received. In a case the change start request to the imaging device 120 of the transmission source is not received, the cloud device management system 80 responds that the device settings are received in step S37.

In response to receiving the setting request for device settings from the cloud device management system 80, the imaging device 120 changes the device settings accordingly in step S38, and notifies the change result of the device settings in step S39. In step S40, the cloud device management system 80 transmits a notification reception response. The cloud device management system 80 stores a result of changing the device settings as a device setting change result.

In step S41, the administrator terminal 71 requests the change result of the device settings at a predetermined timing. In step S42, the cloud device management system 80 transmits the device setting change result.

As described above, the setting change system 70 according to the embodiments of the present disclosure searches whether the change start request to the imaging device 120 is received from the administrator terminal 71 and in a case the change start request is received, includes the setting request in the reply to the periodic communication from the imaging device 120, stores the device setting change result notified from the imaging device 120 and the setting change processing status, refers to the change result storage unit 91, and displays the status and implementation result of the setting change process on the administrator terminal 71.

In this way, the setting change system 70 returns a response including the setting request at the timing of periodic communication, so that the setting change of the device for imaging device management can be executed. Therefore, the setting change system 70 can improve convenience when a user such as the device administrator performs desired setting change for a desired device.

In the present embodiment, an example in which settings are changed according to an instruction from the user has been described, but the present disclosure is not limited to this example. For example, the settings may be change without an instruction from the user.

Figure 30:
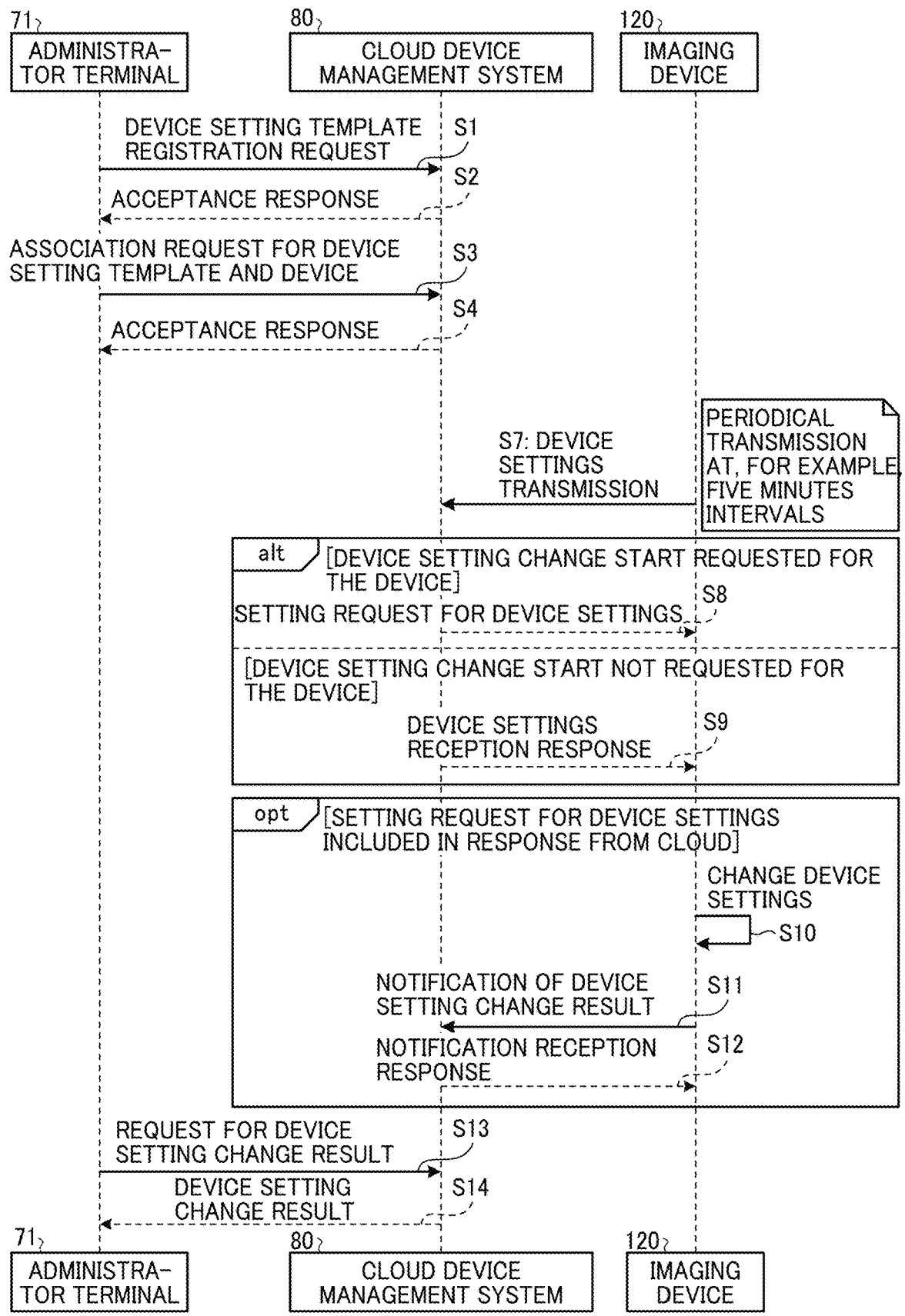
FIG. 30 is a sequence diagram illustrating a modified example of an operation of the setting change system.

FIG. 30 is a sequence diagram illustrating a modified example of an operation of the setting change system. In the modified example in FIG. 30, compared with the sequence illustrated in FIG. 6, the device setting change start request from the administrator terminal 71 to the cloud device management system 80 in step S5 and transmission of the acceptance response to the request to the administrator terminal 71 in step S6 are omitted. In the modified example illustrated in FIG. 30, the association request between the device setting template and the device is regarded as the change start request. By doing so, the cloud device management system 80 can also change settings without the instruction from the user.

Note that the programs executed by the cloud device management system 80 of the present embodiment are preinstalled in the ROM or the like of the cloud device management system 80 and provided. The program executed by the cloud device management system 80 of the present embodiment is a file in an installable format or an executable format and may be configured to be recorded and provided on a computer-readable recording medium.

Furthermore, the program executed by the cloud device management system 80 of the present embodiment may be stored on a computer connected to a network such as the internet, and provided by being downloaded through the network. Also, the program executed by the cloud device management system 80 of the present embodiment may be configured to be provided or distributed through a network such as the internet.

The program executed by the cloud device management system 80 of the present embodiment includes the units described above (the template information generation unit 84, the request reception unit 88, the request management unit 89, the reception unit 92, a transmission unit 94, the change result storage unit 91, and the execution result display unit 90). By reading and executing the program, each of the above units is loaded onto the main storage device, and the template information generation unit 84, the request reception unit 88, the request management unit 89, the reception unit 92, the transmission unit 94, the change result storage unit 91, and the execution result display unit 90 are generated on the main storage device.

The apparatuses or devices described in one or more embodiments are just one example of plural computing environments that implement the one or more embodiments disclosed herein. In some embodiments, the cloud device management system 80 includes multiple computing devices, such as a server cluster. The multiple computing devices are configured to communicate with one another through any type of communication link, including a network, shared memory, etc., and perform the processes disclosed herein. Similarly, the imaging device 120 may include multiple computing devices configured to communicate with each other.

Note that the imaging device 120 is not limited to the image forming apparatus as long as the device includes a communication function. The imaging device 120 includes, for example, an output device such as a projector (PJ), an interactive white board (a whiteboard including an electronic whiteboard function capable of mutual communication (IWB)), a digital signage, a head up display (HUD) device, and an industrial machine, an imaging device, a sound collecting device, a medical device, a network home appliance, an automobile (connected car), a notebook PC, a mobile phone, a smartphone, a tablet terminal, a game console, a personal digital assistant (PDA), a digital camera, a wearable PC or a desktop PC.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different front the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An information processing apparatus connected to an administrator terminal and a plurality of devices through a network, the information processing apparatus comprising:
    circuitry configured to:
        generate, based on an input through a template information generation screen displayed on a display of the administrator terminal, template information including a setting value to be set in the device;
        generate, based on the input through an association screen displayed on the display of the administrator terminal, association information for associating the template information and device identification information for identifying a device among the plurality of devices, for which the setting value included in the template information is to be set;
        receive through the network, communication information transmitted from the plurality of devices, the communication information including device identification information for identifying the device; and
        in response to receiving the communication information including the device identification information associated by the association information, transmit, to a transmission source device of the communication information through the network, a setting request for setting the setting value included in the template information associated with the device identification information in the association information.

2. The information processing apparatus of claim 1, wherein
    the circuitry is configured to, in response to receiving the communication information, transmit a communication response to a transmission source device, including the setting request in the communication response.

3. The information processing apparatus of claim 1, wherein
    the circuitry is further configured to determine whether the device identification information included in the communication information is the device identification information associated by the association information.

4. The information processing apparatus of claim 3, wherein the circuitry is further configured to:
    delete the setting request for the device based on a determination that the setting of the device matches the template information; and
    refrain from transmitting the setting request to the device.

5. The information processing apparatus of claim 1, wherein
    the template information includes a plurality of pieces of template information based on the input through the template information generation screen; and
    the association information includes association with the device identification information for identifying one or more devices for which the setting value included in each of the plurality of pieces of template information is to be set respectively.

6. The information processing apparatus of claim 5, wherein
    the circuitry is further configured to, in response to receiving the communication information including the device identification information of the device that transmitted the communication information in both the one or more devices related to one of the template information and the one or more devices related to the other template information, transmit the setting request for setting either the setting value included in one of the template information or the setting value included in the other template information to the transmission source device, based on a predetermined condition being applying the template information with an older date and time of generation or update of the association information among the plurality of pieces of template information.

7. The information processing apparatus of claim 5, wherein
    the circuitry is further configured to, in response to receiving the communication information including the device identification information of the device that transmitted the communication information in both the one or more devices related to one of the template information and the one or more devices related to the other template information, transmit the setting request for setting either the setting value included in one of the template information or the setting value included in the other template information to the transmission source device, based on a predetermined condition being applying the template information with a newer date and time of generation or update of the association information among the plurality of pieces of template information.

8. The information processing apparatus of claim 1, wherein
    the circuitry is further configured to store in one or more memories, the template information and the association information.

9. The information processing apparatus of claim 1, wherein
the circuitry is further configured to:
receive from the administrator terminal, a setting start request for starting to set the setting value included in the template information, on the device identified by the device identification information associated with the template information; and
in response to receiving the communication information from the device identified by the device identification information associated with the template information based on the setting start request, transmit to the device, the setting request for setting the setting value included in the template information associated with the device identification information of the device.

10. The information processing apparatus of claim 1, wherein
the template information generation screen is a screen for displaying an initial value of each setting item of the device in a changeable manner.

11. The information processing apparatus of claim 1, wherein
the circuitry is further configured to, in response to receiving the communication information including the device identification information associated by the association information, notify the transmission source device of a timing of transmitting to the transmission source device, the setting request for setting the setting value included in the template information associated with the device identification information identifying the device.

12. The information processing apparatus of claim 1, wherein
the circuitry is further configured to receive as a setting item in the template information, whether to operate the device in a first mode in which periodic communication with the information processing apparatus is prohibited while the device is in an energy saving mode, or to operate the device in a second mode in which periodic communication to the information processing apparatus is performed even when the device is in the energy saving mode.

13. The information processing apparatus of claim 1, wherein
the template information includes the setting value for each of a plurality of setting items.

14. The information processing apparatus of claim 13, wherein
the template information includes device setting items and setting values including communication settings, protocol, operation mode, mail settings, history management, and print settings.

15. The information processing apparatus of claim 1, wherein
the device identification information is any one of a device serial ID, serial number, IP address, or MAC address.

16. A system comprising an administrator terminal, a plurality of devices, and an information processing apparatus connected through a network, the administrator terminal including:
circuitry configured to:
display on a display, a template information generation screen for inputting a setting value to be set in the device included in template information; and
display on the display an association screen for associating the template information and the device among the plurality of devices for which the setting value included in the template information is to be set;
the device including:
circuitry configured to:
transmit to the information processing apparatus, communication information including device identification information for identifying the device; and
in response to receiving a setting request transmitted from the information processing apparatus, set the device based on the template information; and
the information processing apparatus including:
circuitry configured to:
generate the template information including the setting value to be set in the device based on the input through the template information generation screen displayed on the display of the administrator terminal;
generate association information for associating the device identification information for identifying the device among the plurality of devices for which the setting value included in the template information is to be set, with the template information generated based on the input through the association screen displayed on the administrator terminal;
receive, through the network, the communication information transmitted from the plurality of devices, the communication information including the device identification information for identifying the device; and
in response to receiving the communication information including the device identification information associated by the association information, transmit to a transmission source device of the communication information through the network, a setting request for setting the setting value included in the template information associated with the device identification information in the association information.

17. An information processing method executed by an information processing apparatus connected to an administrator terminal and a plurality of devices through a network, the method comprising:
generating template information including a setting value to be set in the device based on an input through a template information generation screen displayed on a display of the administrator terminal;
generating association information for associating the template information generated based on an input through an association screen displayed on the display of the administrator terminal with device identification information for identifying the device among the plurality of devices for which the setting value included in the template information is to be set;
receiving through the network, communication information transmitted from a plurality of the devices, the communication information including device identification information for identifying the device; and
in response to receiving the communication information including the device identification information associated by the association information, transmitting, to a transmission source device of the communication information through the network, a setting request for setting the setting value included in the template information associated with the device identification information in the association information.

* * * * *